Oct. 11, 1932.  E. W. BULLOCK ET AL  1,881,999
MACHINE FOR FINISHING GEARS
Filed Oct. 16, 1930   9 Sheets-Sheet 1

INVENTOR
Edward W. Bullock.
BY Robert S. Condon.
Eyvind Finsen.
their ATTORNEY

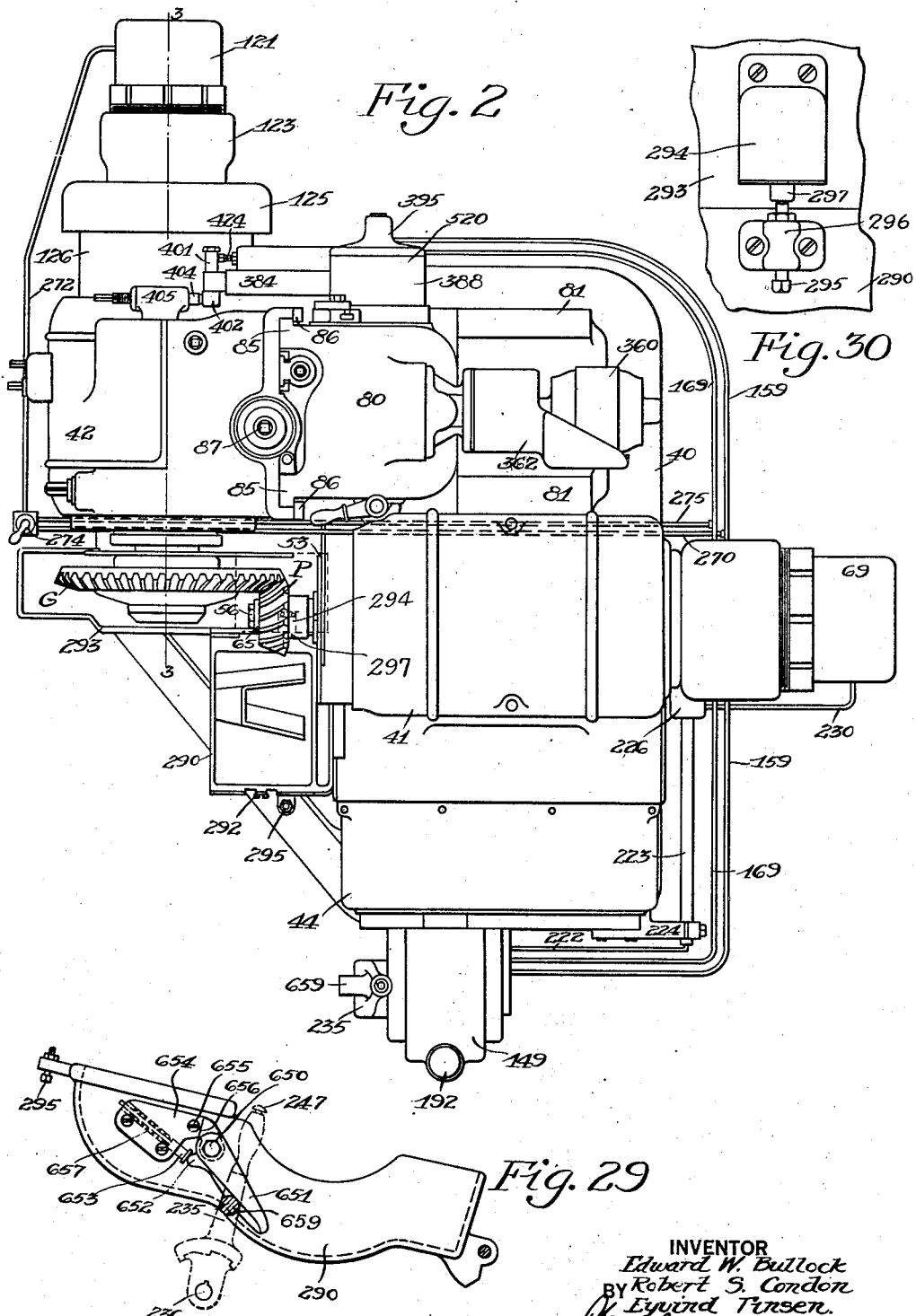

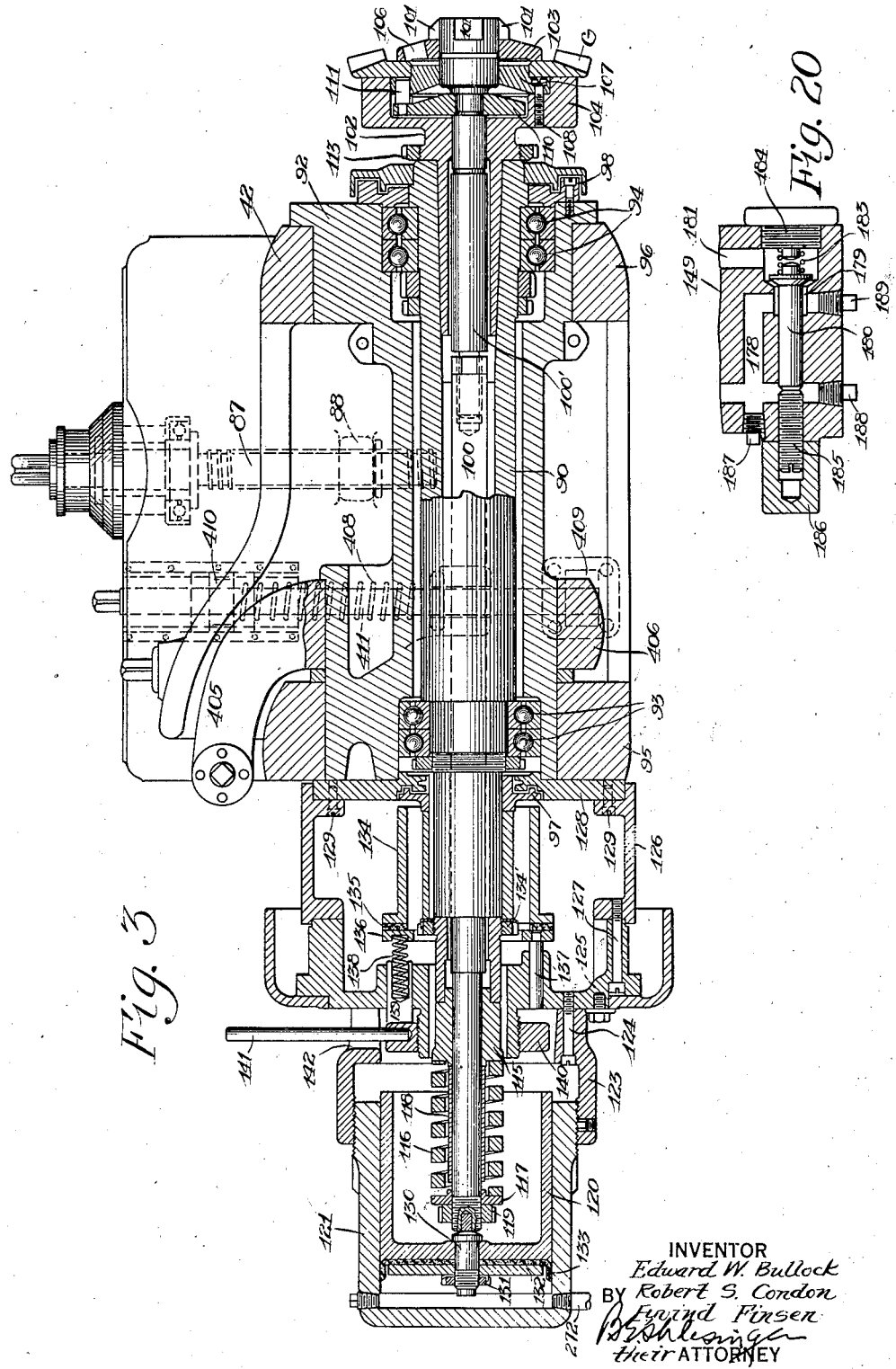

Oct. 11, 1932.  E. W. BULLOCK ET AL  1,881,999
MACHINE FOR FINISHING GEARS
Filed Oct. 16, 1930  9 Sheets-Sheet 4
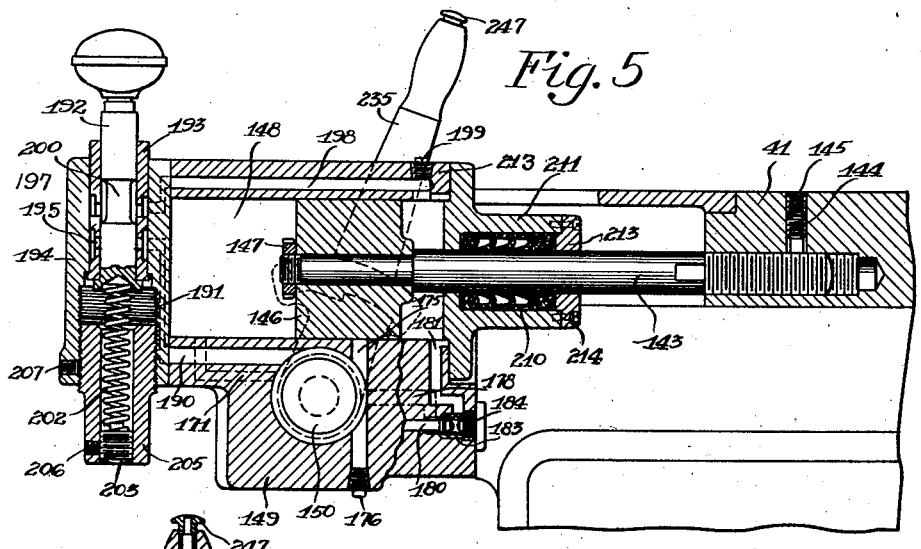
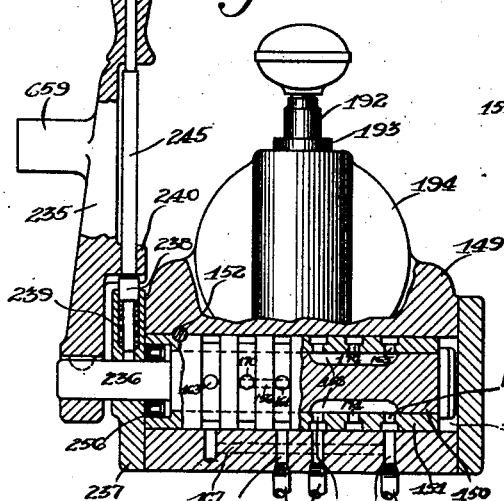
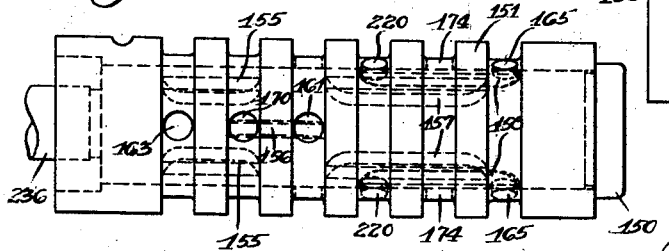
INVENTOR
Edward W. Bullock.
Robert S. Condon.
BY Eyvind Finsen.
their ATTORNEY INVENTOR
Edward W. Bullock
Robert S. Condon
BY Eyvind Finsen
their ATTORNEY Oct. 11, 1932.  E. W. BULLOCK ET AL  1,881,999
MACHINE FOR FINISHING GEARS
Filed Oct. 16, 1930  9 Sheets-Sheet 6
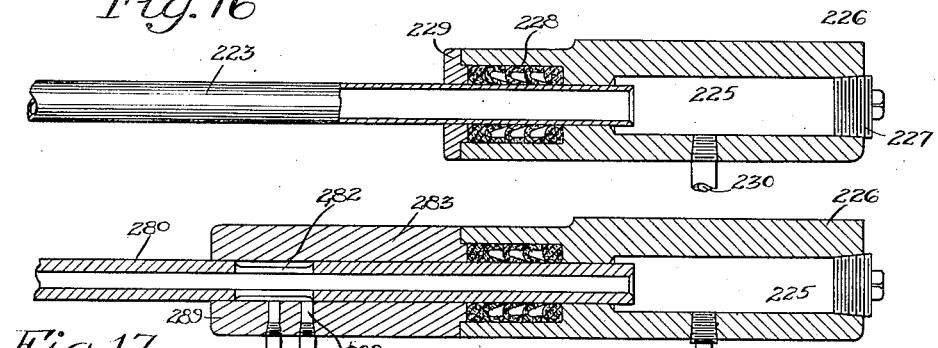
Fig. 16
Fig. 17
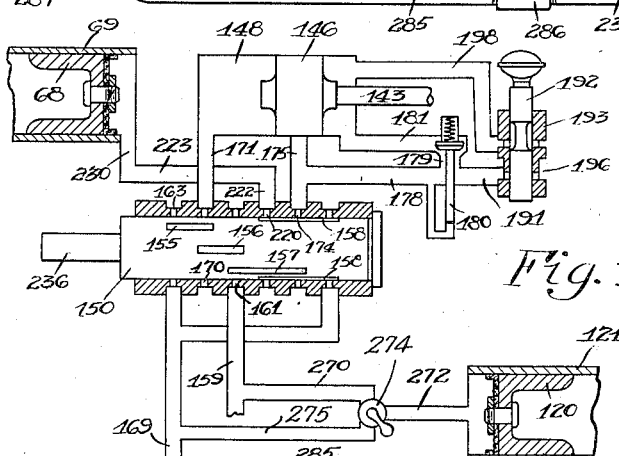
Fig. 18
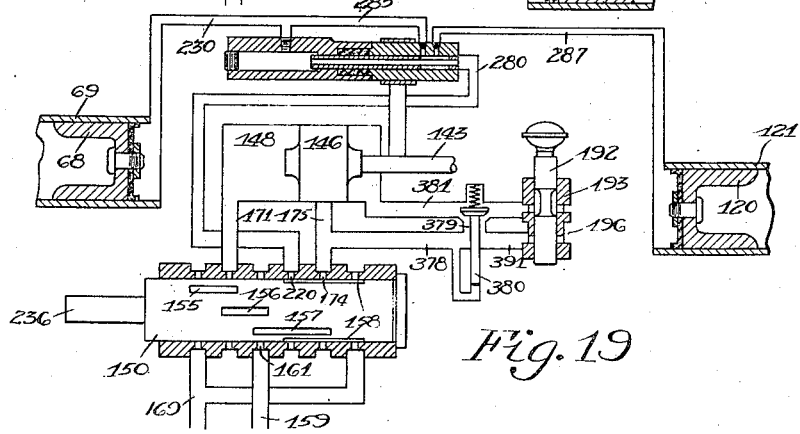
Fig. 19
INVENTOR
Edward W. Bullock
Robert S. Condon
BY Eyvind Finsen
their ATTORNEY Oct. 11, 1932.  E. W. BULLOCK ET AL  1,881,999
MACHINE FOR FINISHING GEARS
Filed Oct. 16, 1930   9 Sheets-Sheet 7
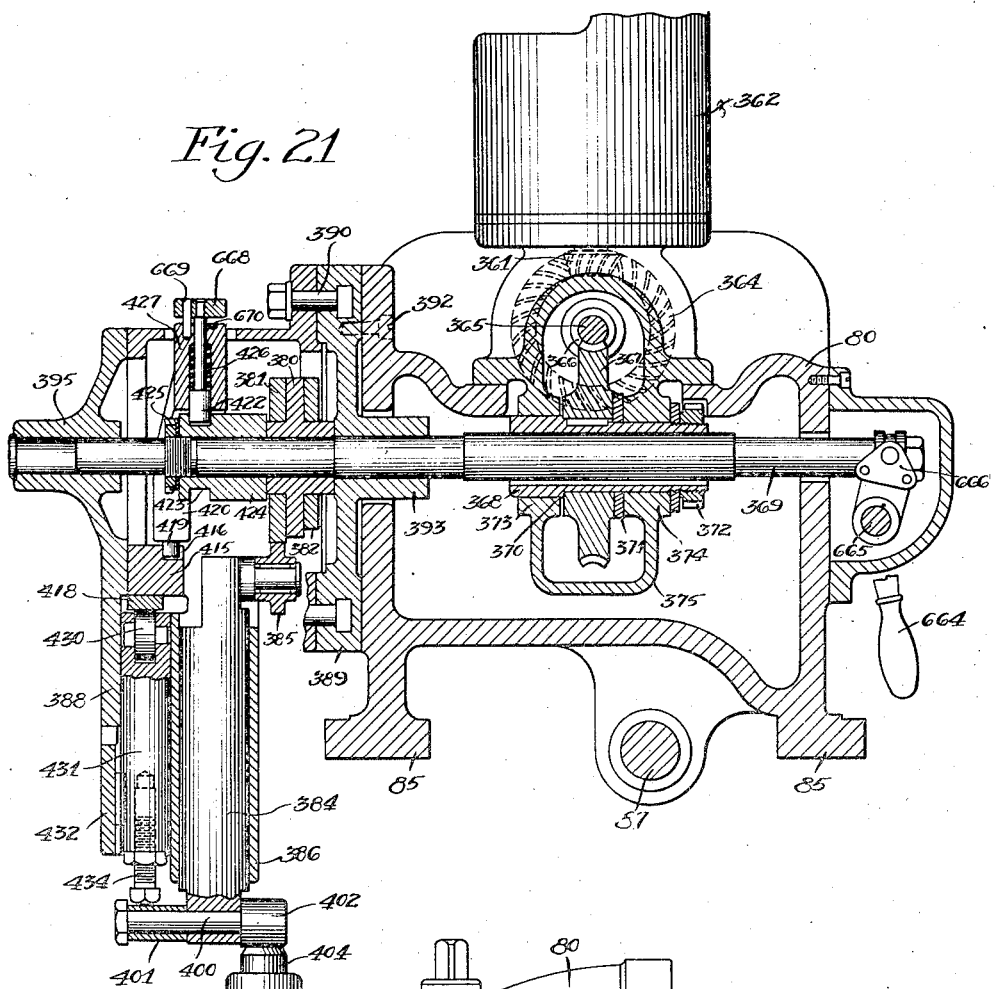
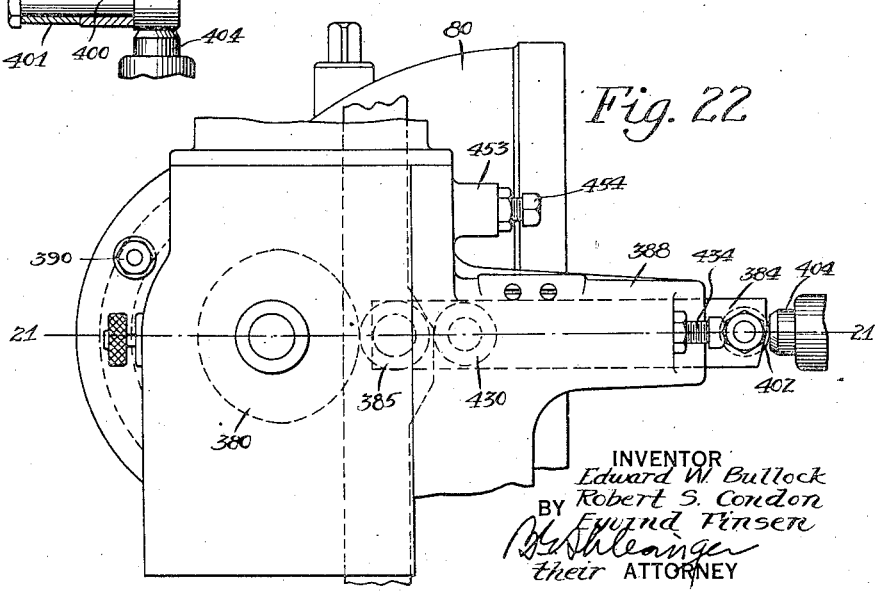

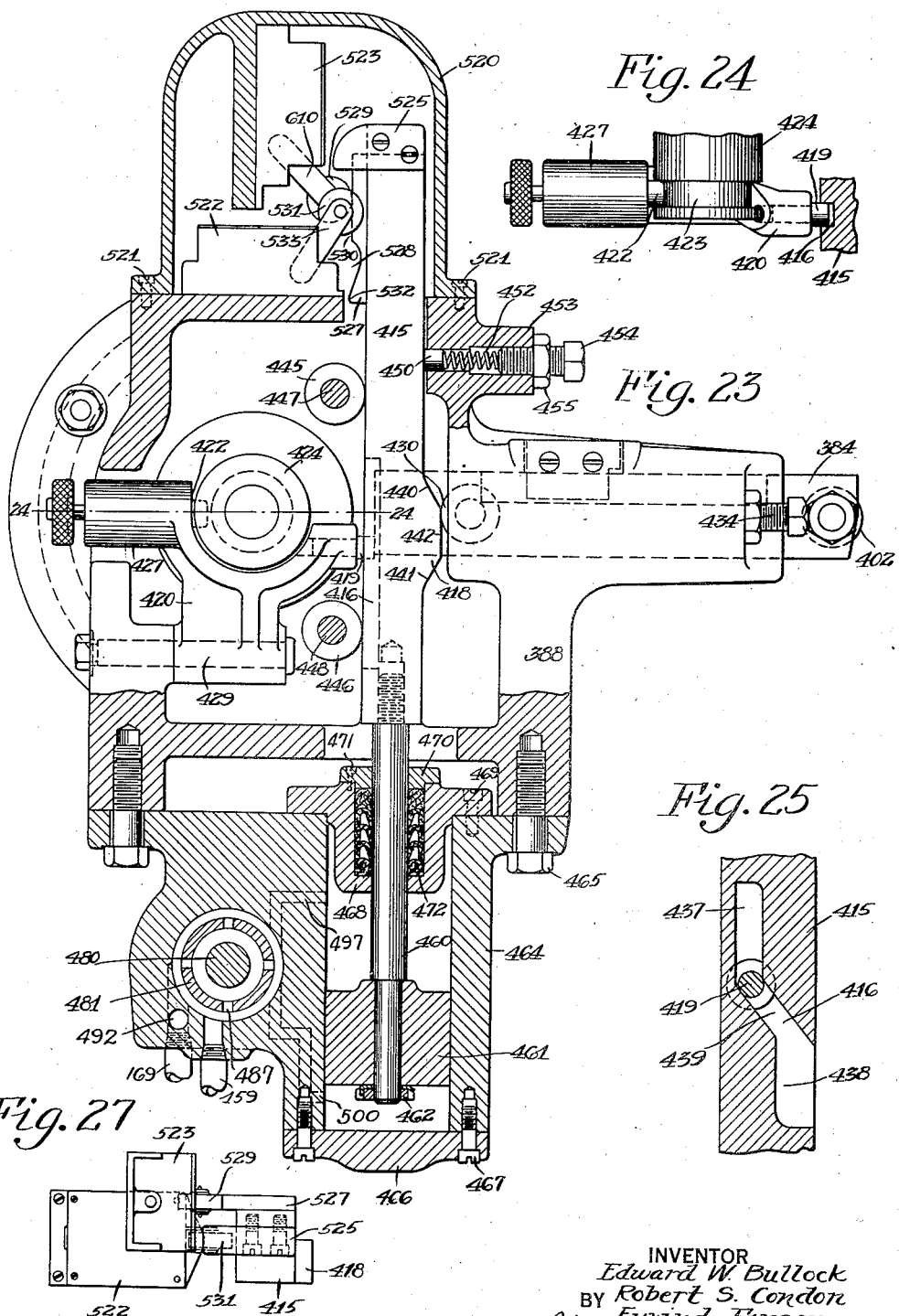

INVENTOR
Edward W. Bullock
BY Robert S. Cordon
Eyvind Finsen
THEIR ATTORNEY

Patented Oct. 11, 1932

1,881,999

UNITED STATES PATENT OFFICE

EDWARD W. BULLOCK, ROBERT S. CONDON, AND EYVIND FINSEN, OF ROCHESTER, NEW YORK, ASSIGNORS TO GLEASON WORKS, OF ROCHESTER, NEW YORK, A CORPORATION OF NEW YORK

MACHINE FOR FINISHING GEARS

Application filed October 16, 1930. Serial No. 489,082.

The present invention relates to machine tools and particularly to machines for testing gears and for burnishing or lapping gears.

One of the principal objects of the present invention is to provide an improved machine for testing, burnishing, or lapping bevel and hypoid gears which embodies the basic principles of operation and construction described in the application of Alton P. Slade, Serial No. 296,562, filed July 31, 1928. In this aspect, the purpose of this invention is to provide a machine of the type described in the Slade application, which will be more nearly completely automatic in operation and, therefore, more suitable for high production work.

A further object of this invention is to provide for machine tools generally a quicker and more convenient control for chucking and dechucking a work-piece and for moving the head, on which the work-piece is mounted, to and from operating position.

A still further object of this invention is to provide in a machine tool, means for more positively safe-guarding the operator against injury.

Other objects of the invention will be apparent hereinafter from the specification and from the recital of the appended claims.

As the invention has been illustrated in connection with a machine of the type disclosed in the Slade application, it may help to a better understanding of the present invention to point out generally, first, the features of the Slade invention and then how the construction and operation of the Slade machine has been improved by the present invention.

In the process of the Slade application, the lapping or burnishing operation is effected by rotating a pair of gears together while simultaneously imparting an additional motion between the gears about an axis eccentric of the axis of one of the gears. This additional motion is preferably produced by oscillation of a carrier in which one of the gears is journaled. In order to obtain the desired tooth bearing on opposite sides of the teeth, it has been found preferable to run the gears together a while in one direction with the carrier oscillating through a certain angle and then run them together in the opposite direction with the carrier oscillating through a different angle. Two different cams or sets of cams are employed for oscillating the carrier. One cam or set of cams is used when burnishing or lapping one side of the teeth and the other cam or set of cams is employed when lapping or burnishing the opposite sides of the teeth.

In a machine built according to the disclosure of the Slade application, after the lapping or burnishing operation has proceeded on one side of the teeth for what the operator considers a suitable length of time, the machine is stopped, either by an initially adjusted automatic stop or by the operator himself. The operator then manually shifts one cam or one set of cams out of operative position and moves the other cam or set of cams into operative position. He then throws a reversing switch and restarts the machine. The gears now run together in the reverse direction with the second cam or set of cams controlling the oscillatory motion of the carrier. The automatic stop again trips to stop the machine or the operator may stop it himself by operating the stop button. The burnishing or lapping operation is now completed. To take the gears off, the operator runs one or both of the heads out by hand and releases the two chucks. The chucks are ordinary screw-operated chucks and the gear heads are run into and out of meshing engagement by hand by rotating handwheels which operate screw shafts mounted in the frame of the machine and meshing with nuts secured to the two gear heads.

From what has been said, it will be seen that in the original Slade machine considerable manual operation is required. For production work, this is not only slow but laborious. The present invention involves no modification of the basic finishing process of the Slade application but improvements have been devised which make the operations faster and less laborious. The chucking mechanism has been improved; simpler, faster, mechanism for moving the pinion head to and from operating position has been provided; a single control has been devised for the pinion chuck and the pinion head movement; the burnishing or lapping operation has been made fully automatic; and means are provided fully safeguarding against either accident to the gears or injury to the operator.

In a machine embodying the features of the present invention, both the chucking mechanism and the movement of the pinion head are fluid-pressure operated and controlled and in the case of the pinion, a single rotary valve controls both the chucking mechanism and, in part, the movement of the pinion head. To chuck the pinion, the operator simply rotates this valve in the proper direction. To move the pinion head in toward operating position, the operator simply rotates this lever further in the same direction. The pinion head moves under control of this valve into a position just short of operating position where it is stopped by fluid-pressure built up during its movement. The operator then lines up the teeth of the gear with those of the pinion before finally bringing the gears into mesh and, when this is done, he moves a hand-valve to exhaust the built-up pressure, and thus inches the pinion head into operating position.

Through the single control valve which governs the chucking of the pinion and the first part of the pinion head movement a simple, convenient control has been afforded for two relatively fast, non-laborious operations. The stopping of the pinion head short of operating position is a safety feature, preventing the operator's hands from being caught in between the gears and preventing damage to the gears.

In the improved machine, the gear-chuck is, also, preferably fluid-pressure operated and may be controlled either by a separate valve or directly from the movement of the pinion head.

In the improved machine, as a further safety factor, there is a normally open button or switch put in the main electrical circuit of the machine. Until this button is closed, the machine cannot be started and, when it is open, the machine stops. Mounted on the guard, which is provided to enclose the gears during the operation of the machine, is a contact member which is engaged with the button to close the switch and hold it closed during the operation of the machine. So, before the machine can be started, the gears must be guarded and they must remain guarded, as long as they are running or the machine will stop.

Once the improved machine is started up, too, the complete burnishing and lapping operation takes place automatically. The gears rotate in one direction with one cam or set of cams oscillating the carrier for a predetermined period. Then through a suitable electrical control device, the other cam or set of cams is shifted into position automatically and the gears reversed automatically. The machine then runs in the opposite direction for a predetermined length of time determined by the setting of a suitable electrical control device, and stops. No attention on the part of the operator during the actual burnishing or lapping operation is necessary, so one operator can run a number of machines simultaneously.

Another feature of the present invention is that when the guard is opened the pinion head is moved away to inoperative position and the pinion blank dechucked.

When the guard is swung out of operative position, a cam on the guard engages the lever operating the pinion head and pinion chuck control-valve, rocking this lever and the valve back to original position and causing the pinion head to be moved to inoperative position and the pinion to be dechucked or released. All that the operator has to do after the lapping or burnishing operation is completed is to swing down the guard and the pinion head is moved to inoperative position and the pinion dechucked automatically.

A further feature of the improved machine is that the gear is dechucked and stripped in a single operation. The draw-rod of the gear chuck carries a stripping member which operates, when the draw-rod is moved forward in the work spindle, to release the gear and, at the same time, to loosen it from the spindle or force it off the spindle entirely.

Through the present invention, then, much higher production is possible. While the invention is illustrated in connection with a gear lapping and burnishing machine of a particular type, however, there are many features of the invention which are not limited to this application. So, for instance, the improved chucking and work head motion control mechanism may be employed on various types of machines. Likewise, the novel safety features. It is to be understood, then, that while the invention has been illustrated in connection with a particular use, this has been done simply for purposes of complete disclosure and to permit of a clear demonstration of its merits and that it is not intended to confine the invention to that use.

In the drawings:

Figure 2 is a plan view of this machine;

Figure 3 is a section through the gear head of this machine, the section being taken substantially on the line 3—3 of Figure 2;

Figure 5 is a sectional view on an enlarged scale through the mechanism for moving the pinion head and for controlling the movement of this head and the pinion chuck;

Figure 6 is a sectional view of parts shown in Figure 5, the section being taken at right angles to the section of Figure 5;

Figure 7 is a side elevation of the sleeve and valve of the combined chuck and pinion head control device;

Figure 8 is a development of the stationary part of this valve;

Figure 9 is a development of the rotary part of this valve;

Figure 31:
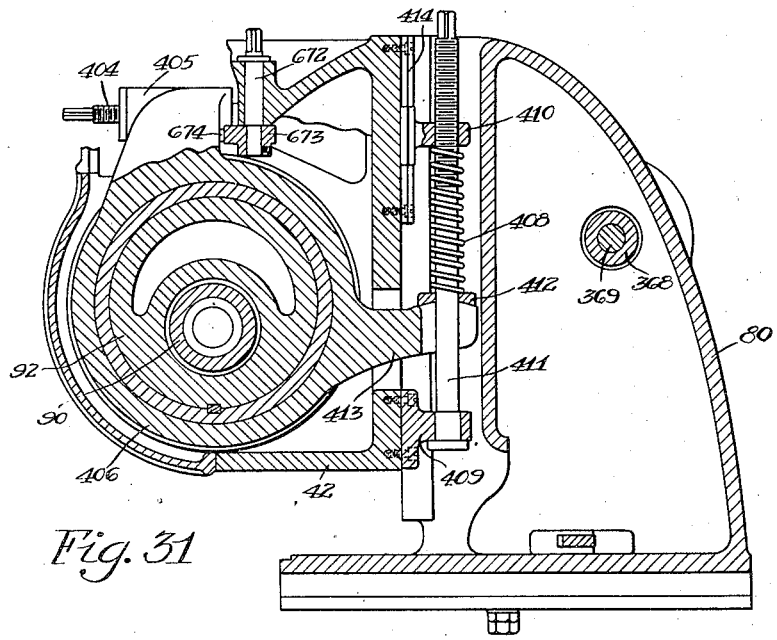
Figure 10:
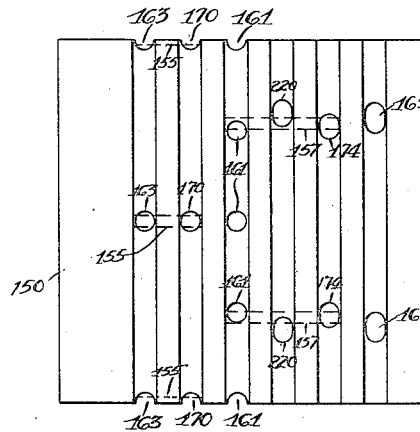
Figure 12:
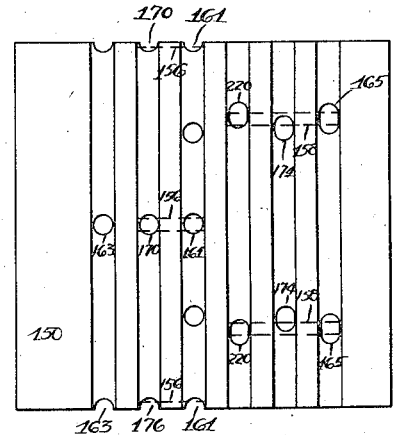
Figure 11:
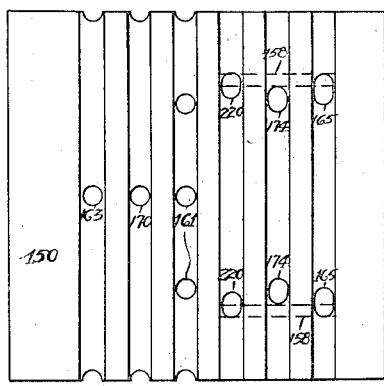
Figure 26:
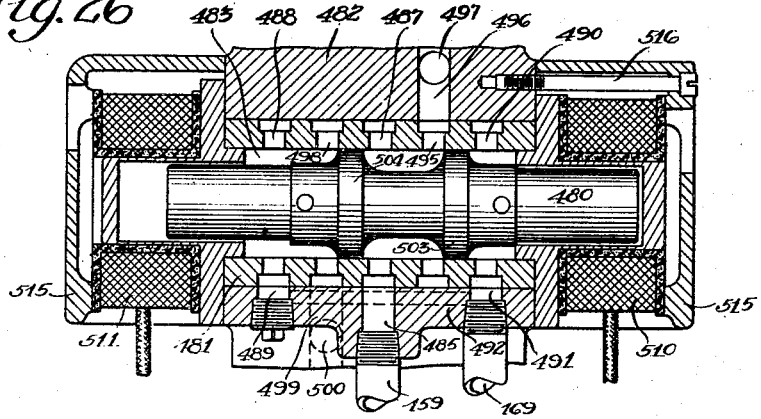
Figure 28:
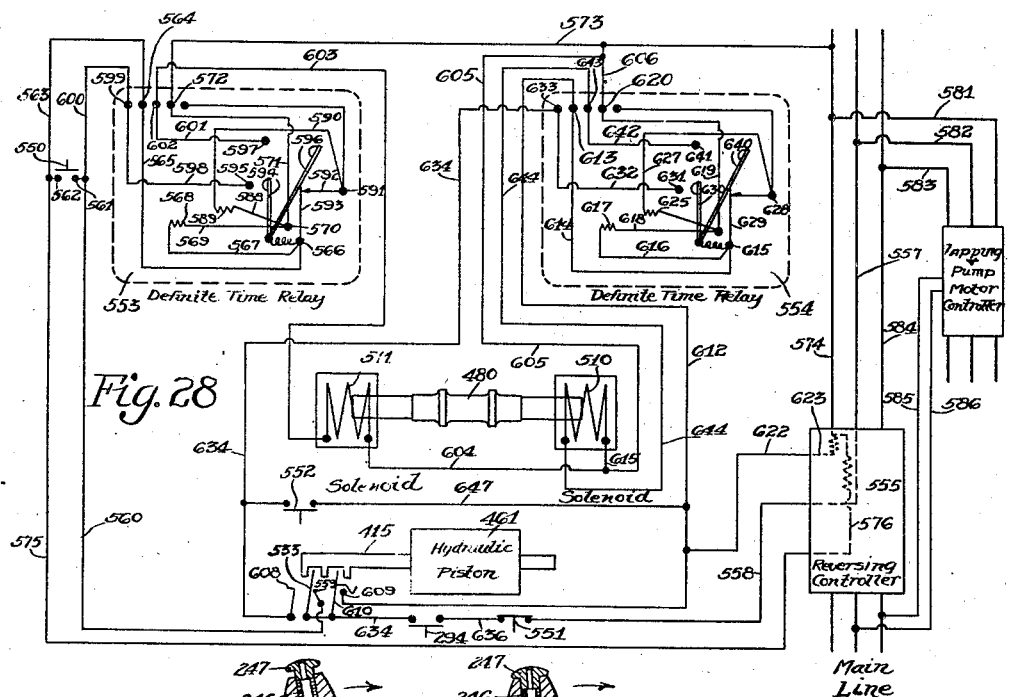
Figures 13, 14, 15:
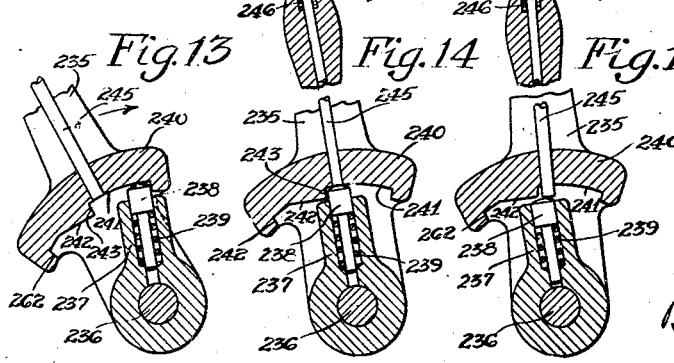

Figures 10 to 12 inclusive, are diagrammatic views illustrating the operation of the valve;

Figures 13 to 15 inclusive, show the three different positions of the valve control lever corresponding to the three views of Figures 10 to 12 inclusive;

Figure 16 is a sectional view of a detail, showing how the motive fluid is supplied to the pinion chuck despite the movement of the pinion head;

Figure 17 is a sectional view showing an alternative construction in which the motion of the pinion head is used to control the operation of the gear chuck;

Figure 18 is a diagrammatic view illustrating the operation of the fluid pressure controlled parts of the machine when the gear chuck is independently operated;

Figure 19 is a diagrammatic view illustrating how the hydraulically controlled parts of the machine operate when the construction used in Figure 17 is employed;

Figure 20 is a detail sectional view, showing the pinion head check valve;

Figure 21 is a section on the line 21—21 of Figure 22, showing the cam shaft and associated parts for oscillating the gear carrier;

Figure 22 is a fragmentary end elevation of the parts shown in Figure 21;

Figure 23 is a detail sectional view, showing the mechanism for shifting the cam shaft;

Figure 24 is a detail view of the yoke for shifting the cam shaft, this view being taken on the line 24—24 of Figure 23;

Figure 25 is a fragmentary view showing the path or track-way of the cam which controls the cam shaft shift-yoke;

Figure 26 is a section on the line 26—26 of Figure 23, showing the valve that controls the movement of the bar which actuates the cam shaft shift-yoke and governs the reversal of rotation of the gears;

Figure 27 is a fragmentary view, showing details of construction of the cam-shift bar and the relative positions of this bar and the two switches which it operates;

Figure 28 is an electrical wiring diagram of the machine;

Figure 29 is a fragmentary view, illustrating how the swinging guard operates, when swung down, to move the pinion head to inoperative position and dechuck the pinion;

Figure 30 is a fragmentary plan view, showing the trip-member carried by the swinging guard in engagement with the safety stop button thereby closing the main circuit of the machine;

Figure 31 is a section taken at right angles to the section of Figure 3.

Referring now to the drawings by numerals of reference, 40 indicates the base or frame of the machine. On this base or frame, there are a pair of heads mounted. These are designated 41 and 42, respectively.

The head 41 slides on ways 43 (Fig. 1) formed on the base or frame of the machine. These ways are protected against grit and dirt by a guard 44 (Fig. 2) which is secured to the head 41 and extends over the ways. Journaled in anti-friction bearings 45 and 46 in the head 41, is the drive spindle 48 of the machine. Labyrinth seals 49, 50, 51 and 52 are provided to prevent dirt or abrasive from getting into the ball bearings and a splash-guard 53 is secured about the inner end of the spindle 49 to deflect the lapping compound away from the spindle and its bearings.

The pinion P of the pair of gears to be burnished or lapped, or if a special burnishing or lapping pinion is used, that pinion, is secured to the drive-spindle 48. The pinion chucking mechanism comprises a drawbar 55 which has an enlarged head 56 at one end and which extends through the bore of the spindle 48, being centered therein by the arbor 58 and the collar 59. A coil-spring 60 is interposed between the collar 59 and a disc 62 which is threaded on the draw-bar 55. This spring 60 surrounds a spacing-sleeve 63 which is interposed between the collar 59 and the disc 62 and which surrounds the drawbar 55. A horse-shoe washer 65 is employed to clamp the pinion P to the spindle 48. When this washer 65 is slipped behind the head 56 of the draw-bar and the draw-bar is drawn rearwardly by the spring 60, the pinion P will be clamped securely to the spindle 48. The tension of the spring 60 can be adjusted by rotating the disc 62 and to hold the disc in any adjusted position a lock-nut 66 is provided.

To release the pinion chuck, hydraulic pressure is applied against the outer face of a piston 68. This piston 68 slides in a cylinder 69 which is adjustably threaded into a cup-shaped cylinder or sleeve 70 that is secured by screws 71 to the rear of the drive head 41. The piston 68 carries a hardened stud 72 in alignment with the draw-bar 55. This stud 72 is secured to the piston 68 by a nut 73 which serves at the same time as a means for clamping the disc 74 and leather washer 75 in position. When hydraulic pressure is applied to the outer end of the piston 68, the stud 72 moves into engagement with the inner end of the draw-bar 55 and pushes this draw-bar forward in the bore of the spindle 48 against the resistance of the spring 60 far enough to allow the operator to remove the horse-shoe washer 65 and take the pinion P off of the spindle. The threaded connection between the cylinder 69 and the sleeve 70 permits of adjusting the cylinder 69 axially of the spindle 48 to allow different jobs to be taken care of.

Figure 1:
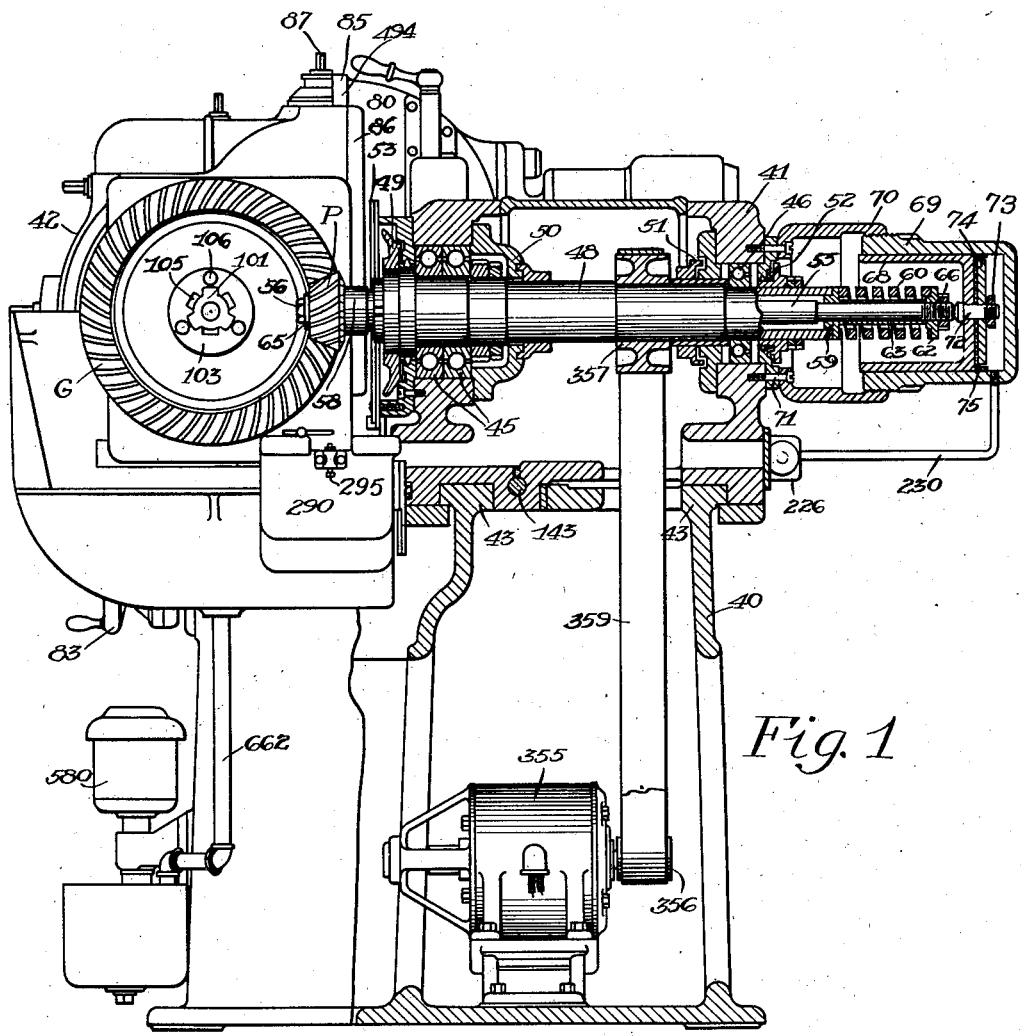
Figure 1 is a side elevation, with parts broken away of a combination burnishing and lapping machine operating according to the principles of the Slade application above referred to and embodying in its construction the improvements of the present invention.

The gear or driven head 42 is vertically adjustable upon a column or upright 80 (Figs. 1, 2, 21, and 22,) which, in turn, is adjustable horizontally on the base or frame 40 of the machine in a direction at right angles to the direction of movement of the head 41. The base 40 is formed with ways 81, extending in a direction at right angles to the ways 43 (Fig. 1) and the column 80 slides on these ways. The adjustment of the column 80 on the ways 81 is effected by rotation of the handwheel 83 (Fig. 1). This handwheel is rotatably mounted in a suitable bearing formed in the base or frame 40 of the machine and is secured to a screw shaft (not shown) that threads into a nut (not shown) that is secured to the column 80.

The head 42 slides in its vertical adjustment on the ways 85 formed on the column 80, being held in any adjusted position by means of the gibs 86. The adjustment of the head on the ways 85 is effected by rotation of the screw shaft 87. This shaft is suitably journaled in the column 80 (Figs. 3 and 21) and threads into a nut 88 formed integral with the head 42. The gear or driven spindle 90 of the machine is carried in the head 42. It is journaled eccentrically in an oscillatory carrier 92 (Fig. 3), that is, the spindle 90 is journaled in the carrier 92 with its axis parallel to but offset from the axis of the carrier 92. The spindle 90 is mounted in anti-friction bearings 93 and 94 in the carrier, while the carrier is journaled in spaced plain bearings 95 and 96 formed integral with the head 42. Labyrinth seals 97 and 98 are provided to prevent dirt or abrasive from getting into the bearings 93 and 94.

The gear G to be burnished or lapped, or, in case, a special burnishing or lapping gear is used, that gear, is secured to the driven spindle 90. For chucking the gear, a hydraulically-released spring-operated chuck, similar in construction to the pinion chuck is used.

The gear chuck includes the two-part draw-bar 100, the arbor 102, the cylindrical guide member 107 and the clamping disc 103. The front section 100' of the draw-bar is provided with an enlarged head to provide three angularly spaced lugs 101 (Figs. 1 and 3). The arbor 102 is formed with a front portion 104 which serves as a pot-type chuck and the gear G is clamped against the chucking face of the arbor by the disc 103. This disc is formed with a central three-armed slot 105. The disc 103 is held in clamping position by bringing the arms of the slot 104 into registry with the lugs 101 of the draw-bar, slipping the disc over the lugs 101 and then twisting the disc to move the arms of the slot 104 out of alignment with the lugs 101. Finger-holes 106 are formed in the disc to permit the operator to handle it readily.

The cylindrical guide member 107 which is secured to the arbor by screws 108 is adapted to enter the bore of the gear G to center the gear on the spindle 90.

Figure 4:
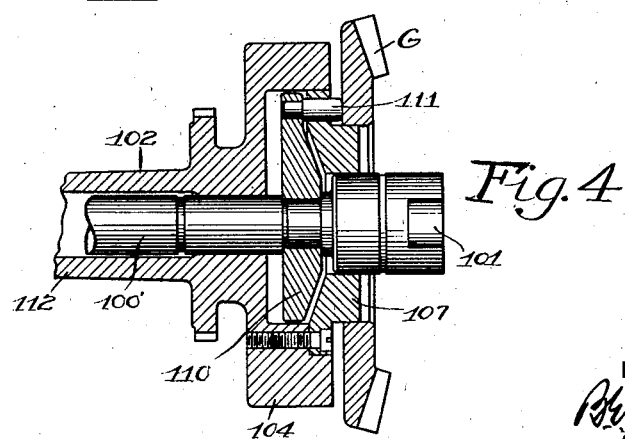
Figure 4 is a sectional view on an enlarged scale of parts shown in Figure 3, showing the stripping device in the act of stripping a gear from the gear arbor.

Mounted behind the guide 107 between shoulders formed on the part 100' of the draw-bar is a disc 110 (Figs. 3 and 4). This disc 110 carries a pin 111 which passes through a hole in the guide 107. The draw-bar slides in the bore of the arbor and when the draw-bar is moved forward, the pins 111 comes into engagement with the back of the gear G, stripping the gear from the guide 107.

The periphery of the stem-portion 112 of the arbor is tapered to fit into the correspondingly tapered bore of the spindle 90. The arbor is wedged into the bore of the spindle 90 to rotate therewith and when the gear is secured to the arbor, the gear and spindle rotate together. A nut 113 which threads onto the stem of the arbor is provided to allow the arbor to be drawn out of the spindle when, for any reason, it is desired to change arbors.

The draw-bar 110 is centered in the bore of the spindle 90 by the arbor and by a guide collar 115 (Fig. 3). A coil-spring 116 interposed between the collar 115 and a disc 117, which is secured to the draw-bar, serves to actuate the draw-bar into chucking position. This spring surrounds a spacing sleeve 118 which, in turn, surrounds the draw-bar being interposed between the collar 115 and the disc 117. The tension of the spring 116 can be adjusted by threading up on the disc or washer 117 and the disc is secured in any adjusted position by the lock-nut 119.

The chuck is released by application of fluid pressure to the rear face of a piston 120. This piston slides in a cylinder 121 which threads into a sleeve 123. The sleeve 123 is secured by screws 124 to a guard 125. This in turn, is secured to a spacing sleeve 126 by screws 127. The spacing sleeve 126 is secured to one part 128 of the labyrinth seal 97 by screws 129.

The piston 120 carries a hardened stud 130. The stud 130 is secured in position by a nut 131 which serves, also, to clamp the disc 132 and the leather washer 133 in position. The stud 130 is mounted centrally of the piston 120 in alignment with the draw-bar 100 and when the piston is forced forward by fluid pressure, the draw-bar is forced forward, also, against the resistance of the spring 116. Thus, the pressure of the clamping disc 103 on the gear G may be released and the gear stripped from the guide 107 by the pin 111. To take off the gear, the operator simply turns the disc 103 until its slot registers with the lugs 101 and lifts it off the draw-bar. The gear G can then be taken off. Figure 3 shows the parts in clamping position and Figure 4 the released position of the draw-bar with the pin 111 operating as a stripper.

With the machine arranged as shown, the pinion P drives the gear G during either the burnishing or lapping operation and it drives the gear solely by the intermeshing engagement of the teeth of the gear and pinion. To obtain a smooth, uniform motion and prevent backlash between the gear and pinion aggravating the errors which it is desired to burnish or lap away, it has been found desirable to provide a backlash brake which will exert a moderate pressure between the gears all the time the machine is running. This insures the uniform motion required to obtain the desired results from the burnishing or lapping operation. The backlash brake will now be described.

Keyed to the spindle 90 is a drum 134. This drum is held against axial movement relative to the spindle by the nut 134' that threads onto the spindle. The rear face of the drum is covered with a suitable brake material 135. The braking pressure is applied by a disc 136. This disc has a series of angularly spaced guide-pins 137 riveted to it that slide in angularly-spaced holes formed in the guard 125. The disc 136 is continuously held in braking position by a series of coil-springs 138. The springs 138 are interposed between the rear face of the disc 136 and the bottom wall of sockets formed in sliding blocks 139. The blocks 139 slide in angularly spaced holes drilled through the guard 125. The pins 137 and blocks 139 alternate around the guard 125. The amount of braking pressure applied to the spindle 90 can be adjusted by rotation of the nut 140. This nut threads onto a projection of the guard 125 and abuts against the rear faces of the blocks 139. The nut can be adjusted by movement of the bar 141 which is secured in the nut and projects through an opening 142 in the sleeve 123.

During the burnishing or lapping operation, the gear and pinion P and G rotate together in mesh and simultaneously an added relative movement is produced between them by oscillation of the carrier 92.

Before describing the means for rotating the gears and the means for oscillating the carrier, however, we shall first describe the means for moving the pinion head into operative position to mesh the pinion with the gear and the mechanism which controls the operation of the pinion and gear chucks.

Threaded into the pinion head 41 (Figs. 1 and 5) is a piston rod 143. This rod is secured in position by the set-screw 144 and the lock-screw 145. The piston-rod 143 is of reduced diameter adjacent its outer end and a piston 146 is secured against the shoulder so formed by a nut 147 which threads onto the end of the piston rod. The piston slides in a cylinder 148 formed by boring out the casting 149 which is bolted to the base or frame 40 of the machine (see also Fig. 2). It will be clear that by applying fluid pressure to opposite sides of the piston 146, the pinion head 41 can be moved on the ways 43 into or out of operating position.

The movement of the piston 146 is controlled by a rotary valve 150 (Figs. 5, 6, 7, 8, and 18). This valve rotates in a sleeve 151 which is secured by the pin 152 (Fig. 6) in the chamber 153 formed by boring the casting 149 below the bore for the cylinder 148 and in a direction at right angles to the direction of the bore 148.

The valve 150 is recessed at different points along its length and around its circumference to provide eight grooves arranged in four groups, each group containing two diametrically opposed grooves. The arrangement of the grooves is clearly shown in Figure 9 which is a development of the valve while the shapes of the grooves are clearly shown in Figures 6 and 7. The grooves of one group are indicated at 155 and of the other groups at 156, 157, 158, respectively. The diametrical arrangement of the grooves of each pair causes the valve to be in balance whatever its position of rotation.

Fluid under pressure is supplied to the valve chamber 153 from the line 159 (Fig. 2) through the duct 160 in the casting 149 and flows through the radial openings 161 in the sleeve 151 into the grooves 156 of the valve 150. The pressure fluid can be exhausted from the valve 150 and valve chamber 153 through either the openings 163 or the openings 165 in the sleeve 151 (Fig. 8). The openings 163 communicate with a duct 167 that leads into a duct 168, which communicates with the openings 165, and the duct 168 leads into the exhaust line 169 (Fig. 2).

The valve 150 is connected with one end of the cylinder 148 through the holes 170 in the sleeve 151 and the duct 171 (Fig. 5). The valve is connected with the cylinder 148 at a point intermediate the length of the cylinder by the openings 174 in the sleeve 151 (Fig. 8) and the duct 175 which is drilled through the casting 149. The lower end of the duct 175 is closed by the plug 176. The duct 175 communicates, also, with a duct 178 (Figs. 5, 18 and 20). The duct 178 leads into a duct 179 that is normally closed by a valve 180. When the valve is open, however, fluid flows from the duct 179 into a duct 181 which leads into the cylinder 148 at one end of the piston 146.

The valve 180 is normally held closed by the coil-spring 183 which is interposed between the head of the valve and the inner face of a screw-plug 184 that is threaded into the casting 149. The valve 180 can be adjusted by the screw 185 which threads into the casting 149 and abuts against the end of the valve stem. To adjust the valve, the cap 186 is threaded off of the screw 185 and a screw-driver applied to the kerf in the head of the screw. The plugs 187, 188 and 189 simply close the ducts which are drilled into the casting 149.

The openings 174 in the sleeve 151 (Figs. 6 and 8) communicate, also, with a duct 190 (Figs. 5 and 18) which leads into a duct 191 that leads into the chamber of a manually slidable valve 192. The valve 192 slides in a sleeve 193 which is secured in a casting 194 that is fastened to the casting 149. The sleeve 193 is provided with ports or openings 196 communicating with the duct 191 and with ports or openings 197 communicating with the duct 198. This latter duct communicates with the cylinder 148 on the same side of the piston 146 as the duct 181. The plug 199 serves to close the outer end of the duct drilled in the casting 149 and forming part of the duct designated at 198.

The stem of the valve 192 is of reduced diameter for the portion of its length designated by the numeral 200. This valve is normally held in upper position, shown in Figure 5, by the coil-spring 202 which is interposed between the bottom of the valve stem and the plug 203. The plug 203 is threaded into a sleeve 205 and houses the spring 202. The sleeve 205 is, in turn, threaded into the valve casting 194. The set-screw 206 serves to secure the plug 203 in position and the set-screw 207 serves to secure the sleeve 205 in position.

When the valve 192 is in the position shown in Figure 5, there is no connection between the duct 198 and the duct 191 but when the valve is depressed against the resistance of the spring 202, pressure fluid on the inner side of the piston 146 can flow from the cylinder 148 through the line 198, the ports 197, the ports 196, the lines 191 and 190, into the chamber 153 of the rotary valve 150 to be exhausted thence through the duct 168 into the exhaust line 169.

Leakage of oil along the piston rod 143 is prevented by the packing 210 which is contained in the cylinder-head 211 that is secured by screws 212 to the casting 149 and which is closed by the cap 213. The cap is secured in position by the screws 214.

The pinion chuck is released by fluid under pressure flowing from the chamber 153 through the ports 220 (Figs. 6, 7, 8, and 18) of the sleeve 151 into the pipe 222 (Fig. 2). The pipe 222 is threaded into a pipe 223 which is carried by a bracket 224 (Fig. 2) that is secured to the base or frame of the machine. The pipe 223 leads into a chamber 225 formed in a casting 226 (Figs. 1, 2 and 16) that is secured to the pinion head 41. The pipe 223 is stationary but the pinion head slides in and out, of course, in its movement to and from operative position. The casting 226 slides, therefore, on the pipe 223 but the chamber 225 is made of sufficient length so that the pipe 223 will always communicate with this chamber regardless of the movement of the pinion head.

A plug 227 threaded into the casting 226 closes one end of the chamber 225 while leakage of the pressure fluid along the pipe 223 is prevented by the packing 228 and the cap 229 which is secured to the other end of the casting 226.

A line 230 connects the chamber 225 with the cylinder 69 (Figs. 1, 2 and 18). Through this line fluid under pressure may enter the cylinder 69 to compress the spring 60 and release the pinion chuck.

The valve 150 is rotated by a hand-lever 235 (Figs. 5, 6, and 13 to 15 inclusive), which is keyed to the shaft 236 of the valve. One of the end plates 237 which closes the chamber 153 is recessed to receive a spring-pressed keeper or stop 238 that is normally urged outwardly of the recess by the coil-spring 239.

The lever 235 is formed with a projecting portion 240 and the lower face of this projecting portion is formed as a cam surface. The portion 241 of this surface is formed on an arc about the axis of the valve shaft 236 as a center, while the portion 242 of this surface is shaped to form a shoulder designated at 243.

The operator can swing the lever 235 from the position shown in Figure 13 in the direction of the arrow until the shoulder 243 contacts the stop 238 but to move the lever further in the direction of the arrow, the operator must depress the rod 245 to depress the stop 238. This is shown being done in Figure 15. The rod 245 slides in a bore in the handle of the lever 235 and in an aligned bore in the projecting portion 240 of this lever. The rod 245 is normally urged upwardly to inoperative position by the coil-spring 246 which is housed in a recess in the the spring 183 and by the pressure of the fluid on the head of this valve.

At the stage referred to, fluid is supplied to the outer end of the piston 146 from the line 159 through the ducts 161, the grooves 156, the ports 170 and the line 171.

The piston 146 moves inwardly carrying the pinion head 41 with it until it reaches the position shown in Figure 5 where the piston itself shuts off the line 175. As already stated, fluid cannot exhaust from the inner end of the cylinder 148 because of the positions of the valve 192 and 180. Hence, when the piston 146 moves over the duct 175, the pressure fluid still remaining in the inner end of the cylinder 148 is entrapped in that end of the cylinder and prevents further inward movement of the piston 146 and the pinion head 41.

The duct 175 is so arranged longitudinally of the cylinder 148 that the movement of the pinion head will be stopped approximately three-quarters of an inch from operating position, that is, from the position in which the pinion teeth will mesh with the teeth of the gear G. In order that the teeth of the pinion may mesh with the teeth of the gear, the operator must rotate the gear G on its spindle, that is, on the guide member 107 (Fig. 3) so that its tooth spaces will align with the teeth of the pinion and the purpose of stopping the pinion head short of meshing position is to prevent the fingers of the operator being caught between the gear and the pinion while the operator is attempting to line the two up.

In order to inch the pinion head into operative position as he turns the gear G, as necessary, to line up the tooth spaces of the gear with the teeth of the pinion, the operator uses the valve 192. As stated above, in the position shown in Figure 5 the pressure from the line 171 is tending to force the piston 146 inwardly but the piston is held against movement by the back-pressure arising from the fact that the three ducts 175, 181 and 198 are all shut off and the fluid cannot exhaust from the inside end of the piston. When the operator pushes the valve 192 down, however, the line 198 is opened to the line 191 through the ports 197 and 196 in the sleeve 193 and the fluid exhausts out of the inside end of the cylinder through the lines 198 and 191, the line 190, the ports 174, the grooves 158, the ports 165 and the duct 168 into the line 169. If the operator presses the valve 192 down for but an instant, releasing it instantaneously, only a slight amount of fluid will be valved out of the inner end of the cylinder 148 and the work head 41 will be moved inwardly only a slight distance. If the operator desires to move the head a greater distance he holds the valve 192 down longer. Thus, the operator can inch the pinion head into position, alternately turning the gear until its teeth line up correctly with the tooth spaces of the pinion. To carry the pinion head on into position, all that is necessary is to hold the valve 192 down until the piston 146 bottoms in the cylinder or the teeth of the pinion mesh fully in the tooth spaces of the gear. The inching process not only protects the operator from injury but the gears from damage.

It will be understood that during the time that the pinion head is being moved into operative position as above described, the gear chuck will be held in released position to permit turning the gear to line it up correctly with the pinion. The gear chuck is held released by pressure from the line 272 (Figs. 2, 3 and 18) which is connected with the main supply line 159 by the line 270.

In the preferred construction, the gear chuck is operated separately from the pinion chuck by means of a three-way valve. When the valve, designated at 274, is open to supply from the line 270, the chuck is released through supply of the motive fluid to the cylinder 121 through the line 272. To chuck the gear, after the pinion has been moved into mesh with it, the operator turns the valve 274 to connect the line 272 with the line 275 leading back to the main exhaust line 169. The fluid then exhausts from the cylinder 121 and the spring 116 (Fig. 3) operates to move the draw-bar 100 rearwardly in the gear spindle 90 and chuck the gear.

An alternative arrangement is shown in Figures 17 and 19 in which the gear is chucked automatically during the movement of the pinion head into operative position and the gear chuck is controlled by the movement of the pinion head. In this case, a pipe 280 is substituted for the pipe 223 (Figs. 2 and 16) and the pipe 280 is turned at a point intermediate its length to provide a portion of reduced diameter as indicated at 282 in Figure 17. The portion 282 of the pipe 280 is adapted to travel in a chamber formed by boring a casting 283 which is secured in any desired manner to the casting 226. The pipe 280 leads, as does the pipe 223, into the chamber 225 of the casting 226. The pipe leading from the chamber 225 is divided, however. The pipe 230 leads, as before, to the cylinder 69 of the pinion chuck (Figs. 1 and 19) but there is an additional line 285 provided, connected with the line 230 by a T 286. The line 285 leads into the chamber of the casting 283. A second pipe 287 leads from this chamber to the cylinder 121 of the gear chuck.

With the modified arrangement, the pinion chuck operates as before but the gear chuck is controlled by the valve formed by the reduced portion 282 of the pipe 280. When this reduced portion registers with the ducts 288 and 289 leading, respectively, from the pipes 285 and 287, the gear chuck pitson 120 handle of the lever 235 and presses against the bottom of the cap-piece 247 of the rod 245.

There are four of the openings or ports 161 and but two of the ports 163, 170, 220, 174 and 165, respectively, in the sleeve 151. The ports communicate, respectively, with the grooves 250, 251, 252, 253, 254, and 255 turned in the periphery of the sleeve 151 and the shoulders formed between these grooves have a fluid-tight fit in the bore 153 of the casting 149 so that leakage along the sleeve 151 is prevented. The packing 256 (Fig. 6) prevents leakage along the shaft 236 of the valve 150.

When the lever 235 is in the position shown in Figure 13, the pinion head 41 is in its outermost inoperative position. The grooves 157 then register with the ports 161, 220 and 174, and the grooves 155 with the ports 163 and 170 in the sleeve 151, as indicated diagrammatically in Figure 10. Thus, the inner end of the piston 146 (Fig. 5) is on supply and the outer end on exhaust and, at the same time, fluid under pressure is being supplied through the line 230 to the outer end of the piston 68 (Fig. 1). The work head 41 is thus held in withdrawn position and the spring 60 of the pinion chucking mechanism is compressed, holding the pinion chuck in released position. The pressure fluid flows from the line 159 through the duct 160, the ports 161 and 174, the line 178 (Fig. 5), the line 179 and the line 181 into the cylinder 148, the valve 180 being forced open by the pressure of the fluid. The fluid exhausts from the other end of the piston 146 through the line 171, the ports 170, the grooves 155, the ports 163, the duct 167, the duct 168 into the line 169. The supply to the cylinder 69 is through the ports 161, the grooves 157, the ports 220 (Figs. 6, 8, and 10), the lines 222 and 223 to the chamber 225 (Figs. 2 and 16) and the line 230.

When the operator moves the lever 235 from the position shown in Figure 13 to that shown in Figure 14, the grooves 155 and 157 are moved out of registry with the ports 163 and 170 and the ports 161, 220 and 174, respectively, and the grooves 158 are brought into registry with the ports 220 and 165. Thus, the line 230 leading into the cylinder 69 (Fig. 1) is put on exhaust and the spring 60 operates to force the draw-bar 55 rearwardly in the spindle 48 to chuck the pinion P.

This position of the valve 150 with reference to the sleeve 151 is illustrated diagrammatically in Figure 11. The fluid exhausts from the cylinder 69 through the line 230, the chamber 225, the line 223, (Figs. 1 and 16), the line 222 (Figs. 2 and 6), the ports 220, the grooves 158, the ports 165, the duct 168 into the exhaust line 169.

The pinion P is now chucked but it is to be noted that the lever 235 cannot be moved further until the operator presses the head 247 of the rod 245 downwardly in the lever 235 to force the stop 238 out of engagement with the shoulder 243 (Fig. 14). When this is done, the lever can be moved on further from the position shown in Figure 14 to the position shown in Figure 15 and beyond until the stop 238 contacts the shoulder 262 of the projection 240 of the lever in the extreme inward position of the lever 235.

Provision is made so that the lever 235 will be stopped at the position shown in Figure 14 to insure that the chucking of the pinion takes place before the pinion head moves into position and to avoid the possibility of injury to the operator which would be present were it possible to chuck the pinion and move the pinion head into position simultaneously. It is to be noted, that the stop 238 acts as an absolute safety. Thus, it would be useless for the operator to attempt to run the head into position while chucking by first depressing the rod 245 and moving the lever 235 in from the position shown in Figure 13 with the rod held depressed, for then the rod 245 would become interposed between the shoulder 243 and the stop 238 and the lever would stop even short of the position shown in Figure 14. The operator would then have to release the rod 245, move the lever 235 up to the position shown in Figure 14 and again depress the rod 245 to move the lever on further.

As the lever 235 moves from the position shown in Figure 14 to the position shown in Figure 15 and beyond, the grooves 158 of the valve 150 move into registry with the ports 174 of the sleeve 151 while at the same time overlapping the ports 220 and 165 of this sleeve, as indicated diagrammatically in Figure 12. At this time, the grooves 156 will have moved into registry with the ports 170 and 161, as also shown in Figure 12. This position of the valve is illustrated, also, in Figures 5, 6, and 7. The pinion chuck still remains on exhaust and the inner end of the piston 146 (Fig. 5) is now put on exhaust while the outer end is put on supply. Thus, the pinion head 41 moves in toward operative position.

The fluid exhausts from the cylinder 148, at the position of the valve 150 just described, through the duct 175, the ports 174, the grooves 158, the ports 165, the duct 168 into the main exhaust line 169. It is to be noted, that the fluid cannot exhaust, at this stage, from the inner end of the piston 146 through the duct 198 because the valve 192 is in the raised position shown in Figure 5 and is closing the ports 196 which lead into the duct 191. It is to be noted, also, that the fluid cannot exhaust from the inner end of the piston 146 through the line 178 because the valve 180 (Figs. 5 and 20) is held closed by will be put either on supply or exhaust depending upon whether the pipe 280 is on supply or on exhaust. The pinion is chucked when the valve-lever 235 is moved from the position of Figure 13 to that of Figure 14 but the gear is not chucked until in the movement of the pinion head, the casting 282 has moved far enough to bring the ducts 288 and 289 into registry with the valve section 282 of the pipe 280. Then the cylinder 121 of the gear chuck is put on exhaust automatically and the spring 116 chucks the gear.

With the gear and pinion in mesh and both chucked, the machine is ready for operation. As an additional safety factor, however, provision is made whereby it is impossible to start the machine until the guard, which is intended to enclose the gear and pinion during the operation of the machine, is in position. 290 designates this guard (Figs. 1, 2, 29 and 30). It is hingedly mounted on the frame of the machine and is adapted to be swung up into operative position. In Figures 1, 2, and 29 it is shown in inoperative position. It is held in operative position by a spring-clip 292 (Fig. 2) which engages over the fixed guard 293 which is shown in dotted lines in Figure 2 and is fixedly secured to the gear head 42. 294 (Fig. 30) designates a normally open electric switch which may be of any standard or suitable construction. This switch is inserted in the main line of the machine and as long as it is open the machine cannot be started. It is mounted on the guard 293. 295 designates a screw that is threaded into a lug 296 which is secured to the guard 290. When the guard is closed, this screw contacts the button 297 of the switch 294, closing the switch and enabling the machine to be started. When the guard is opened, however, the contact is broken and the machine is stopped. To start the machine, then, the guard 290 must be closed and if this guard is opened, the machine is stopped. Thus, through the guard 290 and the switch 294, absolute protection is provided at all times to prevent the operator from being injured by the running gear and pinion.

We shall now describe the operation of the machine itself. To effect the burnishing or lapping operation, the gear and pinion are rotated together and the gear simultaneously swung about an axis eccentric of its own axis by oscillation of the carrier 92. After the gear and pinion have rotated together a predetermined length of time in one direction, their motion is reversed and they are rotated together a predetermined length of time in the opposite direction and then the machine stops. At the time of reversal, the cam which has been oscillating the carrier 92 is moved out of operative position and a second cam automatically moved into operative position. Through the use of two cams, as described, the desired tooth bearing is obtained on opposite sides of the teeth of the gear or gears being burnished or lapped.

The rotary movements of gear and pinion are produced by rotation of the pinion spindle 48, the gear being driven by the pinion by reason of their intermeshing engagement. The pinion spindle is driven from the motor 355 (Fig. 1) mounted in the base of the machine through the pulley 356 which is connected to the armature shaft of the motor, the pulley 357 which is secured to the spindle 48, and the belt 159 which connects the two pulleys.

Mounted on the column 80 of the machine is a motor 360. This motor actuates the mechanism for oscillating the carrier 92. The motor drives the spiral bevel pinion 361 through a suitable coupled connection guarded by the guard 362. The pinion 361 meshes with and drives a gear 364 which is secured to the worm shaft 365. This shaft carries a worm 366 that meshes with and drives the worm wheel 367. The worm wheel 367 is keyed to a sleeve 368. The sleeve has a splined connection with a cam-shaft 369 so that the cam-shaft may slide freely in the sleeve 368 but will rotate therewith. The sleeve 368 is formed with a shoulder at 370 and the worm wheel 367 is held between this shoulder and the washer 371 when the nut 372 is threaded up on the sleeve. The sleeve rotates in the bearings 373 and 374 formed in the bracket 375 which is secured in any suitable manner to the column 80.

Keyed to the cam shaft 359 is a disc 380. The periphery of this disc is concentric with the axis of the cam shaft but the disc is provided with hub portions projecting axially in both directions from the disc itself and on these hubs are mounted the cams 381 and 382, respectively.

One of these cams is used while the gear G and pinion P are rotating in one direction and the other while the pair are rotating in the opposite direction. As the cam shaft rotates, which ever of the cams 381 or 382 is in operative position imparts a sliding motion to the bar 384 (Figs. 2, 21, 22 and 23), which carries a roller or follower 385 that is adapted to engage the periphery of either of the cams. The bar 384 slides in a suitable tubular guide 386 formed in a bracket 388. This bracket 388 is angularly adjustable on the plate 389, being secured in any adjusted position by means of the T-bolts 390, the heads of which engage in the circular T-slots formed in the plate 389. The plate 389 is secured to the column 80 by screws 392 and is formed centrally with a bearing 393 for the cam shaft 369. The bracket 388 is formed, also, with a bearing for the shaft 369. This bearing is designated 395.

Mounted in the outer end of the bar 384 is a stud 400 on which is mounted a sleeve 401 and which is formed with an enlarged head 402. The head 402 of the stud 400 engages the head of a contact member 404 that is threaded adjustably into the arm 405 of a yoke-member 406 (see Figures 2 and 3). The yoke-member 406 takes its bearing on the carrier 92 having an annular bearing portion surrounding the carrier and is secured to the carrier 92 so that when the yoke-member is oscillated the carrier oscillates also.

The contact member 404 is held in engagement with the head 402 of the stud 400 to force the roller 385 into engagement with the periphery of the cam 381 or the cam 382, according to which one of these cams is in operative position, by the spring 408. This spring surrounds the rod 411 that is mounted in the lugs 409 and 410 and is interposed between the lug 410 and the washer 412 which is carried by the furcated arm 413 of the carrier 92. (Figs. 3 and 31). The lug 410 is adjustable in a guide 414 on the head 42 to adjust the tension of the spring 408, the lug having threaded engagement with the rod 411 for the purposes of this adjustment.

It will be clear that as the cam shaft 369 rotates, rotating the cams 381 and 382, an oscillatory movement will be imparted to the carrier 92 through the yoke 405, the contact member 404, the stud 400 and its head 402, the bar 384, the roller 385 and whichever of the cams 381 or 382 this roller is in engagement with. The oscillatory motion of the carrier 92 causes the gear G to be swung about an axis eccentric of its own axis. This motion combined with the rotation of the gear and pinion together constitutes, as described, the burnishing or lapping movement.

The cams 381 and 382 may be of any suitable shape, as determined by the form of tooth bearing which is desired on the side tooth surfaces of the gears. Two cams are provided because the oscillating motion of the carrier 92 must occur at different times in the burnishing or lapping of the two sides of the teeth in order to secure suitable tooth bearing on the two sides. This is all well understood in the art, and is clearly explained in the Slade application above mentioned.

To lap or burnish the two sides of the teeth, the gear G and pinion P are run together first in one direction with one of the cams 381 or 382 oscillating the carrier 92 and then the gears are reversed and the other cam oscillates the carrier. In the present machine, the reversal of direction of rotation of the gears is effected automatically by means which will hereinafter be described and between rotation in opposite directions, the cam shaft 369 is shifted automatically to bring the cams 381 and 382 successively into operative position. The means for shifting the cam shaft will be described now.

Mounted in the bracket 388 for sliding movement therein is an elongated bar 415 (Figs. 21, 23, 24 and 25). Formed in one face of this bar is a cam slot 416, the shape of which is clearly shown in Figure 25. The opposite face of the bar is formed to provide a projecting cam portion 418 (See Figure 23). The walls of the cam slot 416 are adapted to engage a pin or stud 419 that is secured in one arm of the pivoted yoke member 420. The other arm of the yoke member 420 carries a pin or stud 422 which engages in a peripheral groove 423 formed in a sleeve 424 (Fig. 21) that is keyed to the cam shaft 369. The sleeve 424 is held against axial movement with reference to the cam shaft 369 by a nut 425 that threads onto the cam shaft and forces this sleeve into abutment with one hub of the disc 380. It will be seen that when the bar 415 is moved up or down the yoke 420 will be rocked about its pivot 429 to shift the cam shaft 369 axially.

The stud or pin 422 is held in engagement with the groove 423 of the sleeve 424 by a coil-spring 426 and the yoke member 420 is formed with an enlarged hollow boss 427 which houses this spring.

The cam portion 418 of the bar 415 is adapted to engage a roller 430 (Figs. 21 and 23) that is rotatably mounted in a bar 431. The bar 431, which is cylindrical in shape, is slidably mounted in a tubular guide 432 formed in the bracket 388 and extends alongside the bar 384. There is a screw 434 threaded into the outer end of the bar 431 and the head of this screw is adapted to engage the periphery of the sleeve 401 which is mounted on the stud 400.

The parts 437 and 438 (Fig. 25) of the cam slot 416 in the bar 415 extend in the direction of movement of the bar and these two parts of the cam slot are connected by a portion 439 which is inclined to the direction of movement of the bar and to the portions 437 and 438 of the slot. When the bar 415 is shifted, it will be seen that while the study 419 is traveling in either the portion 437 or the portion 438 of the cam slot 416, the yoke 420 will remain stationary but that when the stud 419 enters the inclined portion 439 of the slot 416, the yoke 420 will be rocked about its stud 435 causing the cam shaft 369 and the cams 381 and 382 mounted thereon to be shifted by reason of the engagement of the stud 420 carried by the yoke with the groove 423 formed in the sleeve 424 which is secured to the cam shaft.

The cam portion 418 of the bar 415 is so formed with reference to the cam slot 416 that before the stud 419 enters the inclined portion 439 of the cam slot 416 in either direction of movement of the bar, the roller 430 will ride up on one of the inclined portions 440 or 441 of the cam 418, depending on the direction of movement of the bar, and will be in engagement with the dwell surface 442 of this cam.

As the roller 430 rides up on either of the inclined portions 440 or 441 of the cam 418, the head of the screw 434 will engage the periphery of the sleeve 401 of the stud 400 causing the bar 384 to be moved in its guide 386 to carry the roller 385 out of engagement with whichever of the cams 381 or 382 that it has previously been in engagement with and while the roller is traveling on the portion 442 of the cam 418, the roller 385 is held out of operative position. Thus, the roller 385 is disengaged from the cam 381 or the cam 382, as the case may be, before the cam shaft is shifted and is held out of operative position while the shifting is taking place.

After the gears being burnished or lapped have rotated together for a predetermined length of time in one direction, the bar 415 is moved, to cause the cam 418 to first disengage the roller 385 from the cam 381 or the cam 382, as the case may be, as just described and then cause the cam 416 to rock the yoke 420 about its pivot 435 and shift the camshaft 369 to bring the other cam 382 or 381, as the case may be, into operative position. In the further movement of the bar 415, the roller 430 slides down off of the cam portion 418, allowing the roller 385 to return into operative position and engage the periphery of the cam 382 or 381, as the case may be, whichever is now in operative position. After the gears have rotated for a predetermined length of time in the reverse direction with the other cam 382 or 381, as the case may be, in operative position, the bar 415 is shifted back to initial position, causing the roller 385 to be first moved out of operative position and the cam shaft to be shifted back to original position.

The periodic movements of the bar 415 are controlled automatically by means which will be hereinafter described. In these movements, the bar is guided by the rollers 445 and 446 which are mounted on studs 447 and 448 in the bracket 388 (Fig. 23) and the bar is held in contact with these rollers by the spring-pressed plunger 450. The rollers 445 and 446 engage one face of the bar and the plunger 450 the opposite face. The plunger is held in engagement with the bar by the coil-spring 452 which is housed in a hollow boss 453 formed on the bracket 388 and the tension of this spring can be adjusted by the set-screw 454 which threads into the boss 453 and is locked in any adjusted position by means of the lock-nut 455. The rod 415 is also guided in its movement by the bearings for the piston rod 460 which is secured to the bar 415 and by the piston 461 which is secured to the piston rod.

The bar 415 is shifted hydraulically at the proper times by application of fluid pressure to one or other end of the piston 461 just referred to. This piston 461 is held against a shoulder on the piston rod 460 by means of a nut 462 and the piston rod 460 is threaded at its upper end into the lower end of the bar 415. The piston moves in a cylinder 464 which is secured by screws 465 to the casting 388.

The lower end of the cylinder is closed by a cap 466 which is secured in position by screws 467. The upper end of the cylinder 464 is closed by the cylinder-head 468 which is held in position by screws 469. A suitable piston-packing 472 is enclosed in the head 468 and the upper end of this packing is held in position by a cap 470 which is secured in position by screws 471. The piston rod is guided in its movements by the bore in the cap 470 and by the bore in the bottom wall of the head 468 through which it passes.

The movements of the piston 461 are controlled by the valve 480 (Fig. 26) which slides in a sleeve 481 that is mounted in the bore 483 of a valve-chamber 482 which is cast integral with the cylinder casting 464 (Fig. 23). Motive fluid is supplied to the valve-chamber from the line 159 (Fig. 2) through the port 485 (Fig. 26) and the radial openings 487 in the sleeve 481. The motive fluid is exhausted from the valve-chamber through the radial openings 488 and 490 in the sleeve 481 and the ports 489 and 491 which communicates with these openings, respectively. The ports 489 and 491 are connected by a line 492 drilled in the valve-chamber casting 482 and the port 491 is connected to the exhaust line 169 (Fig. 2).

The valve-chamber 482 is connected with one end of the piston 461 through the radial openings 495 in the sleeve 481 and the ducts 496 and 497 drilled in the casting 482. The valve-chamber is connected with the opposite end of the piston through the radial openings 498 in the sleeve 481 and the ducts 499 and 500 in the casting 482.

The valve 480 is of the balanced type, being provided with two spaced shoulders 503 and 504 which fit the interior of the sleeve 481 so as to provide fluid-tight seals.

With the valve in the position shown in Figure 26, the motive fluid enters the valve-chamber through the port 485 and the openings 487 and passes thence through the openings 495 and the ducts 496 and 497 into the upper end of the cylinder 464, forcing the piston 461 downwardly as shown in Figure 23. The fluid exhausts from the opposite end of the cylinder 464, through the ducts 500 and 499, the openings 498, the openings 488, the port 489 and the duct 492 into the line 169.

The valve is moved by alternately energizing the solenoids 510 and 511 one of which is mounted at each end of the valve chamber. The valve is moved into the position shown in Figure 26 when the solenoid 510 is energized.

When the solenoid 511 is energized, the valve 480 is shifted to the left from the position shown in Figures 27 and 26 and the lower side of the piston 461 is put on supply and the upper side on exhaust, moving the bar 415 upwardly. The solenoids are covered by caps or guards 515 which are secured in position by screws 516 that thread into the casting 482.

The solenoids 510 and 511 are energized automatically at the proper intervals in the operation of the machine. After the machine has been started, the lapping or burnishing operation proceeds with the gears rotating together and with the cam 382 actuating the carrier 92 for a predetermined length of time as determined by the setting of a definite time relay. Then the solenoid 511 is energized to move the valve 480 to the left from the position shown in Figure 26, putting the lower end of the piston 461 (Fig. 23) on supply and the upper end on exhaust. As the piston 460 and bar 415 move upwardly, the roller 430 first rolls up on the cam 418 to disengage the roller 385 (Fig. 21) from the cam 382 with which it has been in engagement. Then the cam 416 (Figs. 23 and 25), operates to rock the yoke 420, shifting the cam shaft 369 (Fig. 21) to bring the cam 382 into position to oscillate the carrier 92. Then the roller 430 rolls off of the cam 418 and the roller 385 now engages the cam 381. The direction of rotation of the gears is then reversed and the burnishing or lapping operation proceeds with the gears rotating in the reverse direction for a predetermined length of time, as determined by the setting of a second definite time relay. Then the solenoid 510 is energized to return the valve 480 to the position shown in Figure 26 and put the upper end of the piston 461 on supply and the lower end on exhaust to return the bar 415 to its original position.

The definite time relays are themselves thrown in and out of circuit by the motion of the bar 415. Housed within a dome-shaped cover 520 secured to the top of the casting 388 by screws 521 (Fig. 23) are a pair of switches 522 and 523. The switch 522 is a double pole switch and may be of any standard or suitable construction. The switch 523 is a single pole switch and may be of any standard or suitable construction. Secured to the bar 415 at the upper end of one side thereof, is a cam member 527. The cam-member 527, is formed with surfaces 530 and 532 parallel to the direction of movement of the bar and with a depression between said surfaces indicated at 528. The switch 523 as stated, is a normally closed switch, but as long as the roller 529 of this switch rides on the surfaces 530 or 532 of the cam 527, the switch is held open. It is only when the roller rides into the notch 528 of the cam that the switch is allowed to close. When the bar 415 is in its lowermost position, the catch 525 engages the roller 531 of the switch 522, and holds the circuit to one time relay closed against the resistance of a spring forming part of the switch and tending to swing the roller and switch arm 533 upwardly. When the electromagnet 511 is energized the bar 415 is moved upwardly. This disengages the catch 525 from the roller 531, releasing the switch arm. Under actuation of the spring the circuit to the first relay is immediately opened and the switch-arm is moved to its other position. In the further upward movement of the bar, the roller 529 rolls off of the cam surface 530 into the notch 528, closing the switch 523 to close momentarily the circuit to the second relay. As the roller 529 rides out of the notch 528 onto the surface 532 of the cam, the switch 523 will be again opened but the circuit to the second relay will remain closed through operation of the relay as will hereinafter be described. When the second relay functions the electromagnet 510 will be energized to cause the fluid pressure operated mechanism to return the bar 415 to initial position but as both relays will now be open the electrically operated parts of the machine will stop.

One way in which the machine may be wired in order to accomplish the desired results is illustrated diagrammatically in Figure 28. At some convenient point on the machine there are attached an electric start button 550, an electric stop button 551 and an electric reverse start button 552. The safety button, which is normally open but which is closed by the guard 290 (Figs. 29 and 30), is designated at 294 in the diagram. Other parts which have already been described are, also, designated by the same numerals which have heretofore been used in designating them. The two definite time relays, to which reference has already been made are indicated in the diagram at 553 and 554, respectively. These relays are mounted in suitable fashion on the machine as is, also, the reversing controller designated at 555. The relays and the reversing controller may be of any suitable construction. There are several standard makes on the market.

The stop button 551 is normally closed. Assuming that the guard 290 has been swung up into operative position, the safety stop button 294 will be closed. The operator may then start the machine by pressing the start button 550. The current will then flow from the main line 557, through the reversing controller 555, the line 558, the stop button 551, the safety button 294, to the switch 522. In the starting position of the machine, this switch is held closed to make contact at the point 559 by the catch 525 of the bar 415, the bar being in its lowermost position. The current flows through the switch through the line 560 to one terminal 561 of the start button 550. The button being closed, the current flows from the other terminal 552 of this button through the line 563 to the terminal 564 of the relay 553. It flows thence through the line 555 of the relay to the terminal 556 of the relay and thence through the line 557 to the relay motor designated at 568. Thence it flows through the line 569, terminal 570, line 571, terminal 572 and line 573 back to the main line 574. At the same time a circuit is made from the terminal 562 of the start button 550 through the line 575, through the reversing controller 555 and the line 576 of that controller to the motor 355 (Fig. 1), thus starting this motor to drive the pinion spindle 48 and because of the mesh of the pinion with the gear G, rotating the two in mesh. The motor 360 (Fig. 2) which actuates the mechanism for oscillating the carrier 92 and the motor 580 (Fig. 1) which actuates the lapping pump are driven continuously in one direction independently of the reversing controller through the lines 581, 582 and 583 which are connected to the main lines 574, 557 and 584, respectively, and through the lines 585 and 586 which are connected to the main lines 567 and 585, respectively.

At the time that the start button 550 is pressed, the current also passes from the terminal 570 of the relay 553 through the line 588 of the relay, the coil 589 of the relay, the line 590, the terminal 591, the line 592 and the line 593 back to the line 565, completing the circuit.

The coil 589 energizes an electro-magnet forming part of the relay 553. This electromagnet draws in the switch arm 594 to make contact at 595. The switch arm 596 is secured to the arm 594 to move therewith but, in the type of relay employed here, is held out of contact with the terminal 597 by a cam which, however, is being rotated by the motor 568 when that motor is started as above described.

The button 550 is a normally open button and as soon as the operator releases it, after having started the motor 355, it springs open but the circuit to the motor 355 and the relay 553 is maintained by the contact made at 595 by the switch arm 594 which has been drawn into contacting position by the coil 589. The line 598 extends from the point 595 through the relay to the terminal 599 of the relay and thence through the line 600 to the line 560 back to the main line.

The cam forming part of the relay is set initially to allow a predetermined period to pass before it permits the switch arm 596 to close contact at 597. The setting of the cam is determined by the length of time which it is desired that the gears run together in one direction before reversal. When the arm 596 makes contact at 597, a circuit is made from 597 through the line 601, the terminal 602, the line 603 to the electro-magnet 511, thence through the line 604, the line 605, the line 606, the line 573 back to the main line 574.

In the way just described, the solenoid 511 is energized to move the valve 480 to the left from the position shown in Figure 26. With this movement of the valve, the lower part of the cylinder 464 (Fig. 23) is put on supply and the upper end on exhaust. Thus, the bar 415 is moved upwardly, moving the catch 525 away from the roller 530 of the switch 522 and releasing the arm of this switch. The spring in the switch immediately functions to cause the switch arm to break contact at 559 and make contact at 608. As the bar 415 moves upwardly, also, the roller 529 of the switch 523 drops into the groove 528 of the cam 527 and allows the switch to momentarily make contact at 609.

When this occurs, the circuit is from the line 557 through the reversing controller 555, the line 558, the stop 551, the safety button 294, the switch arm 610 of the switch 523, the terminal 609, the line 611, the line 612, the terminal 613 of the relay 554, the line 614 of this relay, the terminal 615 of the relay, the line 616 of the relay to the motor 617 of the relay. Thence it passes through the line 618, the line 619, the terminal 620, the line 606 and the line 573 back to the main line 574. Thus, the motor 617 of the relay 554 is started to rotate the cam of that relay which controls the time of operation of the relay.

At the same time, the circuit is completed through the lines 614, 612, 622, the reversing controller 555 and the line 623 of that relay to the motor 355 (Fig. 1). When contact is broken at 559 by the movement of the catch 525 of the bar 415 upwardly, the circuit to the motor 355 is broken and this motor stops, but when contact is closed at 609, as just described, the motor is restarted but in the reverse direction through the reversing controller 555. Thus, while the second relay is operating, the gear and pinion are rotating in the reverse direction from the original direction of their rotation.

Now, the switch arm 610 is allowed to make only a momentary contact at 609, the contact being broken again when the roller 529 of the switch arm rides out of the notch 528 of the cam 527 onto the surface 532 of this cam. The circuit to the motor 355 is maintained, however, because during the momentary contact at 609, the coil 625 of the relay 554 has been energized through the line 626, the line 627, the terminal 628 and the line 629 back to the line 614. When this coil 625 is energized, it draws the switch-arm 630 into contact at 631, making a circuit from 631 through the line 632, the terminal 633, the line 634, the contact 608, the switch-arm 533, the line 635, the safety button 294, the line 636, the stop button 551, the line 558, the reversing controller 555 back to the main line 557.

The switch arm 640 of the relay 554 is connected to move with the switch arm 630 of this relay but is held from making contact at 641 by the cam of the relay which is being rotated by the motor 617 of the relay. When the predetermined length of time has elapsed, however, the cam will have rotated far enough to allow contact to be made at 641 and the circuit will then be through the line 642, the terminal 643, the line 644, to the solenoid 510, thence through the line 645, the line 605, the line 606, and the line 573 back to the main line 574.

Thus, the solenoid 510 will be energized to move the valve 480 (Fig. 26) back to the position shown in Figure 26.

As the relay 554 will now have performed its function, the circuit to the motor 355 will be broken and this motor will stop, stopping the rotation of the gears. The bar 415 will return to its original down-position under actuation of fluid pressure, but as the contact at 559 was broken and cannot be made again until the bar has returned to its lowermost position and as the start button 550 is now open, the machine will not restart itself. The burnishing or lapping operation is now completed.

The function of the reversing start button 552 is to permit restarting the machine if, for any reason, it were stopped before the cycle had been completed and while the second relay 554 was in operation. Then the machine might be restarted by pressing the button 552. This would close the circuit from the line 557, through the reversing controller 555, the line 558, the stop button 551, the line 636, the safety button 294, the switch-arm 533, the terminal 608, the line 634, the reversing start button 552, the line 647, the line 612, the terminal 613, the line 614, the terminal 615, the line 616, the motor 617, the line 618, the line 619, the terminal 620, the line 606, and the line 573 back to the main line 574.

It will be noted, that should the guard 290 (Fig. 29) be swung down either when the relay 553 or the relay 554 is in operation, the button 294 will open, the circuit will be broken and the motor 355 (Fig. 1) stopped.

When the burnishing or lapping operation has been completed, the operator swings the guard 290 down out of the way. Pivotally mounted at 650 on the guard is a cam-member 651 (Fig. 29). This cam-member has a lug 652 formed integral with it. A spring-pressed plunger 653 which is housed in a plate 654 that is secured to the guard by screws 655 contacts the lug 652 of the cam-member 651 to resiliently hold the cam-member in the position shown in Figure 29 with the surface 656 of the cam-member contacting the stop surface formed on the plate 654.

The plunger 653 is actuated by a spring 657 which is housed in the plate 654.

When the guard 290 is swung down, the cam-member 651 engages a lug 659 (Figs. 2, 6 and 29) formed on the control-lever 235 and as the guard is swung down, the cam-member 651 swings the control-lever 235 back the distance through which it was moved originally, thus swinging the valve 150 back to its starting position.

In the movement of the valve 150 back to starting position, the inner end of the piston 146 (Fig. 5) is put on supply and the outer end on exhaust and the pinion chuck is put on supply to release this chuck. With supply on the inner end of the piston 146, the pinion head 41 is moved outwardly to inoperative position. The supply to the inner end of the piston 146 is from the main supply line 159, through the duct 160, the port 161 (Figs. 6, 8 and 10), the groove 157, the ports 174, the duct 178, the duct 179, and the duct 181 (Fig. 5). The fluid is exhausted from the outer end of the piston 146 through the duct 171, the ports 170, the groove 155, the ports 163, the duct 167, the duct 168 to the main exhaust line 169.

The supply of pressure fluid to the pinion chuck is from the main pressure line 159, through the duct 160, the ports 161, the groove 157, the ports 220, the duct 222 (Figs. 2 and 18), the duct 223, the chamber 225 (Fig. 16), and the line 230 to the cylinder 69 (Fig. 1). The pressure of the fluid entering the cylinder 69 compresses the spring 60 and releases the pinion chuck.

The pinion head is thus drawn to inoperative position, and the pinion dechucked. It can be taken off the spindle 48 by first removing the horse-shoe washer 65. The gear is dechucked by operating the three-way control valve 274 (Fig. 2) to put the line 272 on supply from the line 270 which communicates with the main supply line 159. Thus, the pressure fluid is supplied to the piston 120 (Fig. 3) to compress the spring 116 and release the gear chuck. In the releasing operation, the gear is stripped from the guide-member 107 by the pins 111, as already described. If the alternative construction shown in Figures 17 and 19 is employed, the gear is dechucked automatically when the pinion head 41 moves to inoperative position because when the reduced portion 282 of the pipe 280 coincides with the ports 287 and 288 and the pinion line 230 is on supply, the motive fluid will also be supplied to the chuck to release the same.

The operation of the machine illustrated will be understood from the preceding description but may be briefly summed up here. Assuming the parts to be in inoperative position, the operator places a pinion P on the pinion spindle 48 (Fig. 1) and a gear G on the gear spindle 90 (Fig. 3). The gear head will previously have been brought into operative position by rotating the handwheel 83 (Fig. 1) and the axis of the gear spindle will have previously been adjusted so that it intersects the axis of the gear or is in the desired offset relation relative thereto by rotation of the screw-shaft 87 (Fig. 3) which adjusts the gear head 42 on the column 80. The operator will then swing the lever 235 from the position shown in Figure 13 to the position shown in Figure 14.

The operator will have placed the horseshoe washer 65 on the pinion draw-bar 55 (Fig. 1). He then swings the control lever 235 from the position shown in Figure 13 to the position shown in Figure 14. This rotates the control valve 150, placing the pinion cylinder 69 on exhaust through the line 230, the chamber 225, the line 223, (Figs. 1, 16, 18, and 2), the line 222, the ports 220, the grooves 158, the ports 165, (Figs. 6, 8 and 9), the duct 168 and the main exhaust line 169.

The lever 235 is stopped in the position shown in Figure 14 by engagement of the catch 238 with the shoulder 243 of the lever. To move the pinion head 41 on in toward operative position, the operator depresses the plunger 245, depressing the catch 238 and he then swings the lever 235 inwardly. In this movement, the inner end of the piston 146 is put on exhaust (Fig. 5) through the line 175, the ports 165, the duct 168, and the main exhaust line 169. The outer end of the piston 146 is put on supply from the main pressure line 159, the duct 160, the ports 161, the grooves 156, the ports 170, the line 171. Thus, the piston 146 moves inwardly carrying the pinion head 41 with it until the piston reaches the position shown in Figure 5 where it shuts off the exhaust line 175 and since the fluid can no longer exhaust from the inner end of the piston, the inward movement of the pinion head is stopped. The pinion head is thus stopped a slight distance from operative position, as, for instance, three-quarters of an inch, to prevent injury to the operator or to the gears. The operator can now rotate the gear slightly on the guide 107 (Fig. 2) to align the tooth spaces of the gear up with the teeth of the pinion and as he does this he can gradually inch the pinion head into operative position. The inching is accomplished by depressing the valve 192 (Fig. 5) to exhaust the fluid from the inner end of the piston 146 through the line 198, the ports 197, the ports 196, the line 191, the line 190, the ports 170, the grooves 155, the ports 163, the duct 167, the duct 168 to the main exhaust line 169.

When the pinion is correctly meshed with the gear, the operator turns the valve 274, if the hand control is used, to place the line 272 (Fig. 3) leading from the gear cylinder 121 (Fig. 3) on exhaust through the line 274 to the main exhaust line 169, thus allowing the spring 116 (Fig. 3) to chuck the gear. If the construction shown in Figures 17 and 19 is used, this operation will have been performed automatically during the movement of the pinion head into operative position by the action of the valve 282 formed on the pipe 280.

The pinion and gear are now in mesh. The operator now swings up the guard 290 (Figs. 29, 30 and 28) to close the safety stop button 294. He now presses the start button 550 to start the motor 355 (Fig. 1) and simultaneously presses the starter button controlling the pump motor 580 (Fig. 1) and the lapping motor 360 (Fig. 2). Thus, the gear and pinion will be rotated in mesh from the motor 355 through the belt 359 which drives the pinion spindle 48 (Fig. 1). Thus, also, a lapping compound will be pumped onto the gears from the pump 580 through the line 662 (Fig. 1) if the gears are to be lapped. If the gears are to be burnished, a suitable burnishing lubricant may be placed on the gears before starting the machine or the same pump 580 may be employed to pump this lubricant onto the gears during the operation of the machine. The motor 360 oscillates the carrier 92 in which the gear spindle 90 is eccentrically mounted through the yoke 405, the roller 402, the stud 400, the bar 384, the roller 385, the cam 381, the cam-shaft 369, the wormwheel 367, the worm 366, the gear 364, and the pinion 361 (Figs. 3, 23, 21 and 22). Thus, as the gear and pinion rotate together an oscillating movement is produced between them by oscillation of the carrier 92.

After the gears have rotated together in one direction for a suitable predetermined length of time, as determined by the setting of the relay 553, this relay functions, as described above to energize the solenoid 511 to shift the valve 480 to the left from the position shown in Figure 26. This puts the lower end of the piston 461 (Fig. 23) on supply and the upper end of this piston on exhaust and so the piston and bar 415 which is connected thereto are moved upwardly from the downward position which it occupied when the machine was started. The supply to the lower end of the piston 461 is from the supply line 159 through the ports 487 (Fig. 26), the ports 498, the duct 499, and the duct 500, while the exhaust from the upper end is through the duct 497, the duct 496, the ports 495, the ports 490, and the duct 491, to the main exhaust line 169.

As the bar 415 moves upwardly, it releases the switch 533 to break the contact to the first relay 553 as described, momentarily stopping the motor 355 (Fig. 1), stopping the rotation of the gear and pinion together. The roller 430 (Figs. 23 and 21) also rolls up on the cam 418 moving the bar 431 outwardly to cause the screw 434 to engage the sleeve 401 of the stud 400 to cause the bar 384 to be drawn outwardly to disengage the roller 385 from the cam 381. Instantly, thereafter, in the further upward movement of the bar 415, the roller 419 (Figs. 23 and 25) enters the portion 439 of the cam-slot 415 and the yoke 420 is rocked about its pivot 429 to shift the cam-shaft 369 and bring the cam 382 into operative position.

Immediately thereafter, the roller 529 (Fig. 23) of the switch 523 enters the notch 528 of the cam 527, closing the circuit to the second relay 554 (Fig. 28), as described, re-starting the motor 355 but in the opposite direction.

The gears rotate in the opposite direction for a predetermined length of time as fixed by the setting of the second relay 554 and then the solenoid 510 is energized to return the valve 480 (Fig. 26) to original position. The motor 355 (Fig. 1) is stopped because the second relay has performed its function but the bar 415 moves downwardly under the fluid pressure which is directed into the upper end of the cylinder 464 (Fig. 23) by the now shifted valve 480. The supply line 159 may be connected to an independent pump in the machine or preferably to a supply line which connects several machines together. Likewise, the exhaust line 169 may run to a sump in the machine or to a sump which supplies several machines.

With the valve 480 shifted back to original position, the supply to the upper end of the piston 461 (Figs. 23 and 26) is from the line 159 through the ports 502 and 495, the duct 496 and the duct 497 while the exhaust is from the line 500 through the duct 499, the ports 498 and 488, the duct 492 to the exhaust line 169.

As the bar 415 moves down, the roller 430 rides up on the cam 418 to disengage the roller 385 (Fig. 21) from the cam 381 and immediately thereafter the cam 416 operates to swing the yoke 420 about its pivot 429 and shift the cam-shaft 369 to bring the cam 382 back into operative position.

It will be understood, of course, that while this is taking place the gear and pinion are stopped.

The lapping or burnishing operation having been completed, the operator then swings the guard 290 (Fig. 29) downwardly, causing the cam 651 to engage the projection 659 of the lever 235 and swing the lever back to its starting position shown in Figure 13. This will rotate the valve 150 (Figs. 5 and 6), putting the inner end of the piston 146 on supply to move the pinion head 41 outwardly and putting the piston 68 (Fig. 1) on supply to release the pinion chuck. The gear chuck may be released by the pinion head in its movement, as described, or by manipulation of the three-way valve 274 (Fig. 2) to put the line 272, leading to the piston 120 (Fig. 23) on supply. The piston 120 is thus forced forward to force the draw-bar 100 forward to release the gear and cause the pin 111 to press the gear off of the guide 107. When the clamping plate 106 is removed, the gear can be removed from the gear spindle and when the horse-shoe washer is removed from the pinion draw-bar, the pinion can be removed from the pinion spindle. A new pinion and gear can be placed on the spindles and the machine returned to operative position and restarted for burnishing or lapping this new pair.

In Figure 21 there is shown at 664 a hand-lever for manually shifting the cam-shaft 369 if, for any reason, it is desired to do so. This lever forms part of a bell-crank member which is pivoted at 665 and which terminates in a yoke 666 that engages the cam-shaft 369. In order to shift by hand, it is first required to disengage the plunger 422 of the sleeve 424. To do this, the knob 668 is drawn outwardly by the operator disengaging the pin 669 from the notch in the sleeve 427 which it normally occupies and in which position it is shown in Figure 21, and then the operator turns the knob 668 to bring the pin into engagement with the notch 670. This notch is not as deep as the other notch and thus the plunger 422 is held out of engagement with the sleeve 424 against the resistance of the spring 426.

To permit vertical adjustment of the head 42, the contact member 404 is first disengaged from the roller 402. This is effected by rotating, in the correct direction, the stub-shaft 672 (Fig. 31) which carries a cam 673 that engages with a nose-piece 674 which is secured to the arm 405 of the yoke-member 406. The cam 673 will rock the contact member to disengaged position against the resistance of the spring 408.

While the invention has been described in connection with a particular embodiment and a particular use for that embodiment, it will be understood that it is capable of various modifications and uses and that this application is intended to cover any variations, uses, or adaptations of the invention, following, in general, the principles of the invention and including such departures from the present disclosure as come within known or customary practice in the machine tool art and as may be applied to the essential features hereinbefore set forth and as fall within the scope of the invention or the limits of the appended claims.

Having thus described our invention, what we claim is:

1. In a machine for finishing gears, a pair of spindles, means for detachably securing a gear to each of said spindles, means for adjusting said spindles relative to one another to bring said gears into mesh, means for rotating the spindles in opposite directions, and means controlling said rotation so that after the gears have rotated in one direction for a predetermined length of time they are automatically reversed and then rotated in the opposite direction for a predetermined length of time and then stopped.

2. In a machine for finishing gears, a pair of spindles, means for detachably securing a gear to each of said spindles, means for adjusting the spindles relative to one another to bring the gears into mesh, means for rotating the spindles in opposite directions, means for imparting an added relative movement between the gears while they are rotating in mesh to effect the finishing operation, separate means governing said movement during the finishing of opposite sides of the teeth of the gear, means movable to bring the last named means successively into operative position, and means actuated on said movement to reverse the direction of rotation of said spindles.

3. In a machine for finishing gears, a pair of spindles, means for detachably securing a gear to each of said spindles, means for adjusting the spindles relative to one another to bring the gears into mesh, means for rotating the spindles in opposite directions, an oscilatory carrier in which one of the spindles is journaled with its axis parallel to but offset from the axis of said carrier, separate means for oscillating said carrier when finishing opposite sides of the teeth of the gear, means movable to shift the last named means successively into operative position and means actuated on said movement to reverse the direction of rotation of the spindles.

4. In a machine for finishing gears, a pair of spindles, means for detachably securing a gear to each spindle, means for adjusting the spindles relative to one another to bring the gears into mesh, means for imparting an added relative movement between the gears while they are rotating in mesh to effect the finishing operation, separate means controlling said movement when finishing opposite sides of the teeth of gears, and means governing the operation of the machine adapted to shift one of the last named control means out of operative position and bring the other into operative position and, also, to reverse the direction of rotation of the spindles after the machine has been in operation a predetermined period.

5. In a machine for finishing gears, a pair of spindles, means for detachably securing a gear to each spindle, a carrier in which one of said spindles is journaled with its axis offset from but parallel to the axis of said carrier, means for adjusting the spindles relative to one another to bring the gears mounted thereon into mesh, means for rotating said spindles to rotate said gears in mesh, a pair of cams movable successively into position to effect oscillatory movement of said carrier, and means for shifting one cam out of operative position and the other into operative position after the gears have been running together a predetermined length of time.

6. In a machine for finishing gears, a pair of spindles, means for detachably securing a gear to each spindle, means for adjusting the spindles relative to one another to bring the gears into mesh, means for rotating said spindles to rotate the gears in mesh, means for imparting an added relative movement between the spindles while they are rotating, a pair of members movable successively into position to control said movement, and means for shifting one member out of operative position and the other into operative position after the gears have been rotating together a predetermined length of time.

7. In a machine for finishing gears, a frame, a carrier oscillatably mounted in the frame, a pair of spindles, one of which is journaled in said carrier with its axis parallel to but offset from the axis of said carrier, means for detachably securing a gear to each of said spindles, means for adjusting the spindles relative to one another to bring the gears into mesh, a cam shaft rotatably and slidably mounted in the frame, a pair of cams of different contours secured to said shaft and adapted, respectively, when in operative position to oscillate said carrier on rotation of said cam shaft, means for rotating said spindles to rotate the gears in mesh, means for rotating the cam shaft, means for shifting said shaft axially after the machine has been in operation a predetermined length of time to move one cam out of operative position and bring the other into operative position.

8. In a machine for finishing gears, a frame, a carrier oscillatably mounted in the frame, a pair of spindles, one of which is journaled in said carrier with its axis offset from but parallel to the axis of said carrier, means for detachably securing a gear to each of said spindles, means for adjusting the spindles relative to one another to bring said gears into mesh, a pair of cams having different effective contours rotatably and slidably mounted in the frame, a follower engageable with either of said cams and adapted when in engagement with either to effect oscillation of said carrier on rotation of said cams, means for rotating the gears in mesh, means for rotating said cams, and means operative, after the machine has been in operation a predetermined length of time, to first disengage the follower from the cam with which it has been in engagement and immediately thereafter move the other cam axially to bring it into engagement with said follower.

9. In a machine of the class described, a pair of heads, a spindle journaled in each head, means for detachably securing a gear to each spindle, means for moving one of the heads toward the other, means acting to stop said movement with the gears a predetermined distance apart, and auxiliary means for inching the movable head forward to engage said gears in mesh.

10. In a machine of the class described, a pair of heads, a spindle journaled in each head adapted to carry a gear, means operable to detachably secure a gear to one of said spindles, means for thereafter moving one of the heads toward the other, means acting to stop said movement with the gears a predetermined distance apart, said last named means being movable to permit inching the movable head forward further to engage the gears secured to the two spindles in mesh.

11. In a machine of the class described, a pair of heads, a spindle journaled in each head, means operable to detachably secure a gear to one of said spindles, means for thereafter moving one head toward the other, and means operable automatically on said movement to detachably secure a gear to the other spindle.

12. In a machine of the class described, a pair of heads, a spindle journaled in each of said heads, fluid-pressure operated means for moving one of the heads toward the other, fluid-pressure controlled chucking mechanism for one of the spindles, a movable valve controlling the movement of the movable work head and the chucking mechanism, means for stopping movement of said valve when the movable head has moved a predetermined distance toward the other to stop movement of said head, and auxiliary means for inching said head further into operative position.

13. In a machine of the class described, a pair of heads, a spindle journaled in each head and adapted to carry a gear, fluid-pressure operated means operable to move said heads apart, fluid-pressure operated means for dechucking the gear carried by one of said spindles and a single control device controlling the operation of both fluid-pressure operated means and movable in one direction to effect in sequence the separating and dechucking operations.

14. In a machine of the class described, a pair of heads, a spindle journaled in each head, fluid-pressure operated means for moving the heads apart after the operations of the machine have been completed, fluid-pressure controlled chucking mechanism for one of the spindles, a single valve governing the operation of both fluid-pressure operated mechanisms and movable to first cause movement of the heads apart and then the release of the chucking mechanism.

15. In a machine for finishing gears, a pair of spindles, means for detachably securing a gear to each spindle, means for adjusting the spindles relative to one another to bring the gears into mesh, a guard for said gears, means for rotating the gears in mesh, and means whereby said last named means is inoperative until said guard is in position.

16. In a machine for producing gears, a frame, a pair of work heads mounted on the frame, a spindle journaled in each work head, means for detachably securing a gear to each spindle, means for adjusting the spindles relative to one another to bring the gears into mesh, means for rotating the gears in mesh, a movable guard adapted to cover the gears to protect the operator when the gears are rotating, means for moving said gears apart, and means operable on opening of said guards to actuate said last-named means.

17. In a machine of the class described, a movable head, a guard movable into position to protect the operator during operation of the machine, means for moving the head to inoperative position, and means secured to said guard adapted to operate the last named means when the guard is opened.

18. In a machine for finishing gears, a pair of spindles, means for detachably securing a gear to each of said spindles, means for rotating the spindles to rotate said gears in mesh, means operable after the gears have rotated together a predetermined length of time in one direction to stop said gears and then start them rotating in the reverse direction, and means operative after the gears have rotated in the latter direction a predetermined length of time to stop said machine.

19. In a machine of the class described, a control device comprising a cylinder, a piston movable in said cylinder, a movable valve controlling the direction of application of fluid-pressure to said piston, electro-magnetic means for shifting said valve in opposite directions, and means operable after the machine has been in operation a predetermined period to actuate said means to shift said valve from one position to another and after the machine has run again a predetermined length of time to cause said valve to be shifted back to original position.

20. In combination, a movable head, a spindle journaled in said head, fluid-pressure operated means for moving said head, fluid pressure operated means for chucking a gear on said spindle and a rotary valve controlling both of said fluid pressure operated means and rotatable to first cause said gear to be chucked on said spindle and then to move said head.

21. In combination, a movable head, a spindle journaled in said head, fluid-pressure operated means for moving said head, fluid-pressure operated means for chucking a gear on said spindle, a rotary valve controlling both of said fluid-pressure operated means and rotatable to first cause said gear to be chucked on said spindle and then to move said head, means operable to stop rotation of said valve as soon as the chucking mechanism has functioned, and manually operable means for releasing said stop to permit further rotation of said valve and thereby enable movement of said head.

22. In a machine of the class described, a pair of heads, a spindle journaled in each of said heads, means operable to chuck a gear on one of said spindles, means for moving one of said heads towards the other, and means controlling the operation of the chucking and head-moving mechanisms operable to prevent movement of the head until the gear has been chucked.

23. In a machine of the class described, a pair of heads, a spindle journaled in each of said heads, chucking mechanism for each spindle, means for moving one of said heads toward the other, a movable control member controlling movement of the movable head and the chucking mechanism cooperating with the spindle mounted on said head, said control member being operable on movement in one direction to first actuate the chucking mechanism and then the means for moving the heads, means adapted to stop the movement of the control member as soon as the chucking mechanism has functioned, and manually operable means for releasing said stop means to permit further movement of the control member and thereby enable movement of the heads.

24. In a machine of the class described, a pair of heads, a spindle journaled in each of said heads, fluid-pressure operated means for moving one of said heads, chucking mechanism for each spindle, fluid-pressure operated means controlling the operation of the chucking mechanism of one spindle, a rotary valve controlling both of said fluid pressure operated means and rotatable in one direction to first cause the fluid-pressure controlled chucking mechanism to function, a handle for rotating said valve, a spring-actuated detent adapted to engage said handle and stop further rotation of the valve after the fluid-pressure controlled chucking mechanism has functioned, and a rod slidable in said handle and adapted to be moved to depress said detent to release said handle and permit further rotation of said valve to enable movement of said head.

25. In a machine of the class described, a pair of heads, a spindle journaled in each of said heads, fluid-pressure operated means for moving one of said heads in opposite directions comprising a cylinder, a piston reciprocable therein, ducts for admitting fluid under pressure alternately to opposite ends of the piston, a valve controlling the direction of flow of the pressure fluid to said ducts, one of said ducts being spaced from one end of said cylinder so that it is closed off by the piston in its movement carrying the head into operative position with the head short of operative position and an auxiliary manually-operated valve operable to permit further movement of said piston to allow the head to be brought into operative position.

26. In a machine of the class described, a pair of heads, a spindle journaled in each head, chucking mechanism for detachably securing a gear to each of said spindles, fluid pressure operated means for controlling the chucking mechanism of one spindle, fluid pressure operated means for moving one of said heads into position comprising a cylinder and a piston reciprocable therein and ducts through which pressure fluid may be admitted to one end of the cylinder and exhausted from the other, one duct being so located that when it is on exhaust, the exhaust is shut off and the head stopped before the head has moved fully into operative position, a valve controlling the operation of the chucking mechanism and movement of the head, said valve being rotatable to first actuate the chucking mechanism and then to move the head into position short of full operative position, and a second valve operable manually to control further exhaust from said cylinder to enable movement of the head into full operative position.

27. In a machine of the class described, a pair of heads, a spindle journaled in each of said heads, means for moving one of said heads towards the other to bring the same into operative position, chucking mechanism for detachably securing a gear blank to each spindle, a movable control device for the work head movement and the chucking mechanism of one spindle, said control device being operable to cause said chucking mechanism to be first actuated and then the head to be moved, a detent operable to stop movement of the control device after the gear has been chucked, means for releasing said detent, means operable to stop the work head short of operative position after further movement of the control device, and auxiliary means operable then to inch the work head into operative position.

28. In combination, a movable head, a spindle journaled in said head, fluid-pressure operated means for controlling the movement of said head, chucking mechanism for said spindle, fluid-pressure operated means for releasing said chucking mechanism, and a single, manually-operable control device governing both fluid-pressure operated mechanisms, said control device being movable in one direction to first cause withdrawal of the head from operative position and then actuation of the chuck-releasing mechanism.

29. In a machine of the class described, a movable head, a spindle journaled in said head, chucking mechanism for said spindle, a guard movable into position to protect the operator during operation of the machine, and means operable on opening of said guard to move the head to inoperative position and release said chucking mechanism.

30. In a machine of the class described, a movable head, a spindle journaled in said head, chucking mechanism for said spindle, a guard movable into position to protect the operator during operation of the machine, and means operable on opening of said guard to stop said machine, to move the head into inoperative position and to release said chucking mechanism.

31. In a machine of the class described, a movable head, a spindle journaled in said head, means for detachably securing a gear to said spindle, a guard movable into position to protect the operator during operation of the machine, fluid-pressure operated means for moving said head to inoperative position, a valve controlling said fluid pressure operated means, and means on said guard adapted in the opening of said guard to operate said valve to cause said fluid pressure mechanism to function.

32. In a machine of the class described, a movable head, a spindle journaled in the head, chucking mechanism for said spindle, a guard movable into position to protect the operator during operation of the machine, fluid-pressure operated means for moving the head to inoperative position, fluid-pressure operated means for releasing the chucking mechanism, a valve controlling both fluid-pressure operated mechanisms, and means on said guard adapted, in the opening of said guard, to operate said valve to cause withdrawal of the heads and release of the chucking mechanism.

33. In a machine for finishing gears, a pair of heads, a spindle journaled in each head, chucking mechanism for each of said spindles, means for moving one of the heads toward and from the other, means for rotating said spindles in opposite direction, a movable guard adapted to surround said gears to protect the operator when they are running, means normally adapted to prevent actuation of said spindle-rotating mechanism, means carried by said guard adapted, when the guard is in operative position, to render said last-named means inoperative, and means, operable on movement of the guard from operative position, to move the movable head away from the other head.

34. In a machine for finishing gears, a pair of heads, a spindle journaled in each head, chucking mechanism for each of said spindles, means for moving one of said heads toward and from the other, means for rotating said spindles in opposite directions, a movable guard adapted to surround said gears to protect the operator when they are running, means normally adapted to prevent actuation of said spindle-rotating mechanism, means carried by said guard adapted, when the gear is in operative position, to render the last-named means inoperative, and means, operable on movement of the guard from operative position, for moving the movable head away from the other head and releasing the chucking mechanism of one of said spindles.

35. In a machine for finishing gears, a pair of heads, a spindle journaled in each head, fluid-pressure operated chucking mechanism for one of said spindles, fluid-pressure operated mechanism for moving one of the heads toward and from the other, a valve controlling both of said fluid-pressure operated mechanisms, a lever for operating said valve, means for rotating the spindles in opposite directions, a movable guard adapted to surround said gears to protect the operator during the operation of the machine, means adapted normally to prevent actuation of said spindle rotating means, means carried by said guard adapted, when the guard is in operative position, to render the last-named means inoperative, and means carried by said guard adapted, when the gear is moved from operative position, to engage said lever to cause the movable head to be withdrawn from operative position and the chuck released.

36. In a machine for producing gears, a frame, a pair of spindles, a carrier movably mounted on the frame, means for rotating said spindles in opposite directions and simultaneously moving said carrier, said means for moving said carrier comprising separate drive members connectable, respectively, with the carrier during rotation of the spindles in opposite directions and means for reversing said spindles and for simultaneously disconnecting one drive member from the carrier and connecting the other thereto after the spindles have run together a predetermined length of time in one direction, and means operative after the spindles have rotated together a predetermined length of time in the new direction to stop the spindle rotating means and disconnect from the carrier the second drive member.

37. In a machine of the class described, a frame, a pair of spindles, a carrier movable on the frame, means for rotating said spindles in opposite directions, control means for determining the time of rotation of the spindles in the opposite directions, means for actuating said carrier during rotation of the spindles in opposite directions comprising a pair of cams, and means controlled by said control means for disconnecting one cam from the carrier and connecting the other cam thereto, comprising a cylinder, a piston movable therein, a movable valve controlling the direction of application of fluid pressure to said piston, electrically operated means operable by said control means after the spindles have rotated a predetermined length of time in the opposite directions to shift the valve, respectively, in opposite directions, and means operatively connecting said piston to said cam.

EDWARD W. BULLOCK.
ROBERT S. CONDON.
EYVIND FINSEN.